United States Patent
Shan et al.

(10) Patent No.: US 10,834,317 B2
(45) Date of Patent: *Nov. 10, 2020

(54) CONNECTING AND USING BUILDING DATA ACQUIRED FROM MOBILE DEVICES

(71) Applicant: Zillow Group, Inc., Seattle, WA (US)

(72) Inventors: Qi Shan, Mercer Island, WA (US); Alex Colburn, Seattle, WA (US); Li Guan, Bellevue, WA (US); Ivaylo Boyadzhiev, Seattle, WA (US)

(73) Assignee: Zillow Group, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,286

(22) Filed: Nov. 23, 2019

(65) Prior Publication Data

US 2020/0092473 A1 Mar. 19, 2020

Related U.S. Application Data

(63) Continuation of application No. 15/649,434, filed on Jul. 13, 2017, now Pat. No. 10,530,997.

(51) Int. Cl.
*H04N 5/232* (2006.01)
*G06T 7/73* (2017.01)
(Continued)

(52) U.S. Cl.
CPC ..... *H04N 5/23238* (2013.01); *G06K 9/00671* (2013.01); *G06K 9/00718* (2013.01);
(Continued)

(58) Field of Classification Search
CPC .................................. H04N 5/232; G06T 7/73
(Continued)

(56) References Cited

U.S. PATENT DOCUMENTS

| | | |
|---|---|---|
| 5,140,352 A | 8/1992 | Moore et al. |
| 6,031,540 A | 2/2000 | Golin et al. |

(Continued)

FOREIGN PATENT DOCUMENTS

| | | |
|---|---|---|
| EP | 2413097 A2 | 2/2012 |
| EP | 2505961 A2 | 10/2012 |

(Continued)

OTHER PUBLICATIONS

CubiCasa | From video to floor plan in under 5 minutes, retrieved on Mar. 26, 2019, from https://www.cubi.casa/, 6 pages.

(Continued)

*Primary Examiner* — Amir Shahnami
(74) *Attorney, Agent, or Firm* — VLP Law Group LLP; James A. D. White

(57) ABSTRACT

Techniques are described for automated operations involving acquiring and analyzing information from an interior of a house, building or other structure, for use in generating and providing a representation of that interior. Such techniques may include using a user's mobile device to capture video data from multiple viewing locations (e.g., 360° video at each viewing location) within multiple rooms, and capturing data linking the multiple viewing locations (e.g., by recording video, acceleration and/or other data from the mobile device as the user moves between the two viewing locations), creating a panorama image for each viewing location, analyzing the linking information to model the user's travel path and determine relative positions/directions between at least some viewing locations, creating inter-panorama links in the panoramas to each of one or more other panoramas based on such determined positions/directions, and providing information to display multiple linked panorama images to represent the interior.

20 Claims, 13 Drawing Sheets

(51) Int. Cl.
*G06K 9/00* (2006.01)
*G06K 9/22* (2006.01)
*H04N 5/77* (2006.01)
*H04N 7/18* (2006.01)
*G06T 7/246* (2017.01)
*G01P 1/12* (2006.01)

(52) U.S. Cl.
CPC ............. *G06K 9/22* (2013.01); *G06T 7/248* (2017.01); *G06T 7/74* (2017.01); *H04N 5/23293* (2013.01); *H04N 5/77* (2013.01); *H04N 7/185* (2013.01); *G01P 1/127* (2013.01); *G06T 2207/30244* (2013.01); *G06T 2210/04* (2013.01); *H04N 5/23222* (2013.01)

(58) Field of Classification Search
USPC .......................................................... 348/39
See application file for complete search history.

(56) References Cited

U.S. PATENT DOCUMENTS

| | | | |
|---|---|---|---|
| 6,141,034 A | 10/2000 | McCutchen | |
| 6,317,166 B1 | 11/2001 | McCutchen | |
| 6,320,584 B1 | 11/2001 | Golin et al. | |
| 6,323,858 B1 | 11/2001 | Gilbert et al. | |
| 6,337,683 B1 | 1/2002 | Gilbert et al. | |
| 6,654,019 B2 | 11/2003 | Gilbert et al. | |
| 6,683,608 B2 | 1/2004 | Golin et al. | |
| 6,690,374 B2 | 2/2004 | Park et al. | |
| 6,731,305 B1 | 5/2004 | Park et al. | |
| 6,738,073 B2 | 5/2004 | Park et al. | |
| 7,050,085 B1 | 5/2006 | Park et al. | |
| 7,129,971 B2 | 10/2006 | McCutchen | |
| 7,196,722 B2 | 3/2007 | White et al. | |
| 7,525,567 B2 | 4/2009 | McCutchen | |
| 7,620,909 B2 | 11/2009 | Park et al. | |
| 7,627,235 B2 | 12/2009 | McCutchen et al. | |
| 7,782,319 B2 | 8/2010 | Ghosh et al. | |
| 7,791,638 B2 | 9/2010 | McCutchen | |
| 7,909,241 B2 | 3/2011 | Stone et al. | |
| 7,973,838 B2 | 7/2011 | McCutchen | |
| 8,072,455 B2 | 12/2011 | Temesvari et al. | |
| 8,094,182 B2 | 1/2012 | Park et al. | |
| RE43,786 E | 11/2012 | Cooper | |
| 8,463,020 B1 | 6/2013 | Schuckmann et al. | |
| 8,517,256 B2 | 8/2013 | Stone et al. | |
| 8,520,060 B2 | 8/2013 | Zomet et al. | |
| 8,523,066 B2 | 9/2013 | Stone et al. | |
| 8,523,067 B2 | 9/2013 | Stone et al. | |
| 8,528,816 B2 | 9/2013 | Stone et al. | |
| 8,540,153 B2 | 9/2013 | Stone et al. | |
| 8,594,428 B2 | 11/2013 | Aharoni et al. | |
| 8,654,180 B2 | 2/2014 | Zomet et al. | |
| 8,699,005 B2 | 4/2014 | Likholyot | |
| 8,705,892 B2 | 4/2014 | Aguilera et al. | |
| RE44,924 E | 6/2014 | Cooper et al. | |
| 8,854,684 B2 | 10/2014 | Zomet | |
| 8,861,840 B2 | 10/2014 | Bell et al. | |
| 8,861,841 B2 | 10/2014 | Bell et al. | |
| 8,879,828 B2 | 11/2014 | Bell et al. | |
| 8,953,871 B2 | 2/2015 | Zomet | |
| 8,989,440 B2 | 3/2015 | Klusza et al. | |
| 8,996,336 B2 | 3/2015 | Malka et al. | |
| 9,021,947 B2 | 5/2015 | Landa | |
| 9,035,968 B2 | 5/2015 | Zomet | |
| 9,041,796 B2 | 5/2015 | Malka et al. | |
| 9,071,714 B2 | 6/2015 | Zomet | |
| 9,129,438 B2 | 9/2015 | Aarts et al. | |
| 9,151,608 B2 | 10/2015 | Malka et al. | |
| 9,165,410 B1 | 10/2015 | Bell et al. | |
| 9,171,405 B1 | 10/2015 | Bell et al. | |
| 9,324,190 B2 | 4/2016 | Bell et al. | |
| 9,361,717 B2 | 6/2016 | Zomet | |
| 9,396,586 B2 | 7/2016 | Bell et al. | |
| 9,438,759 B2 | 9/2016 | Zomet | |
| 9,438,775 B2 | 9/2016 | Powers et al. | |
| 9,489,775 B1 | 11/2016 | Bell et al. | |
| 9,495,783 B1 | 11/2016 | Samarasekera et al. | |
| 9,576,401 B2 | 2/2017 | Zomet | |
| 9,619,933 B2 | 4/2017 | Spinella-Marno et al. | |
| 9,635,252 B2 | 4/2017 | Accardo et al. | |
| 9,641,702 B2 | 5/2017 | Bin-Nun et al. | |
| 9,760,994 B1 | 9/2017 | Bell et al. | |
| 9,786,097 B2 | 10/2017 | Bell et al. | |
| 9,787,904 B2 | 10/2017 | Birkler et al. | |
| 9,836,885 B1 | 12/2017 | Eraker et al. | |
| 9,852,351 B2 | 12/2017 | Aguilera Perez et al. | |
| 9,953,111 B2 | 4/2018 | Bell et al. | |
| 9,953,430 B1 | 4/2018 | Zakhor | |
| 9,990,760 B2 | 6/2018 | Aguilera Perez et al. | |
| 9,990,767 B1 | 6/2018 | Sheffield et al. | |
| 10,026,224 B2 | 7/2018 | Bell et al. | |
| 10,030,979 B2 | 7/2018 | Bjorke et al. | |
| 10,055,876 B2 | 8/2018 | Ford et al. | |
| 10,068,344 B2 | 9/2018 | Jovanovic et al. | |
| 10,083,522 B2 | 9/2018 | Jovanovic et al. | |
| 10,102,639 B2 | 10/2018 | Bell et al. | |
| 10,102,673 B2 | 10/2018 | Eraker et al. | |
| 10,120,397 B1 | 11/2018 | Zakhor et al. | |
| 10,122,997 B1 | 11/2018 | Sheffield et al. | |
| 10,127,718 B2 | 11/2018 | Zakhor et al. | |
| 10,127,722 B2 | 11/2018 | Shakib et al. | |
| 10,139,985 B2 | 11/2018 | Mildrew et al. | |
| 10,163,261 B2 | 12/2018 | Bell et al. | |
| 10,163,271 B1 | 12/2018 | Powers et al. | |
| 10,181,215 B2 | 1/2019 | Sedeffow | |
| 10,192,115 B1 | 1/2019 | Sheffield et al. | |
| 10,204,185 B2 | 2/2019 | Mrowca et al. | |
| 10,210,285 B2 | 2/2019 | Wong et al. | |
| 10,235,797 B1 | 3/2019 | Sheffield et al. | |
| 10,242,400 B1 | 3/2019 | Eraker et al. | |
| 10,339,716 B1 | 7/2019 | Powers et al. | |
| 10,366,531 B2 | 7/2019 | Sheffield | |
| 10,395,435 B2 | 8/2019 | Powers et al. | |
| 2006/0256109 A1 | 11/2006 | Acker et al. | |
| 2010/0232709 A1 | 9/2010 | Zhang et al. | |
| 2012/0075414 A1 | 3/2012 | Park et al. | |
| 2012/0293613 A1 | 11/2012 | Powers et al. | |
| 2013/0342533 A1 | 12/2013 | Bell et al. | |
| 2014/0043436 A1 | 2/2014 | Bell et al. | |
| 2014/0044343 A1 | 2/2014 | Bell et al. | |
| 2014/0044344 A1 | 2/2014 | Bell et al. | |
| 2014/0125658 A1 | 5/2014 | Bell et al. | |
| 2014/0125767 A1 | 5/2014 | Bell et al. | |
| 2014/0125768 A1 | 5/2014 | Bell et al. | |
| 2014/0125769 A1 | 5/2014 | Bell et al. | |
| 2014/0125770 A1 | 5/2014 | Bell et al. | |
| 2014/0236482 A1 | 8/2014 | Dorum et al. | |
| 2014/0267631 A1 | 9/2014 | Powers et al. | |
| 2014/0307100 A1 | 10/2014 | Myllykoski et al. | |
| 2015/0116691 A1 | 4/2015 | Likholyot | |
| 2015/0189165 A1 | 7/2015 | Milosevski et al. | |
| 2015/0262421 A1 | 9/2015 | Bell et al. | |
| 2015/0269785 A1 | 9/2015 | Bell et al. | |
| 2015/0302636 A1 | 10/2015 | Amoldus et al. | |
| 2015/0310596 A1 | 10/2015 | Sheridan et al. | |
| 2015/0332464 A1 | 11/2015 | O'Keefe et al. | |
| 2016/0055268 A1 | 2/2016 | Bell et al. | |
| 2016/0134860 A1 | 5/2016 | Jovanovic et al. | |
| 2016/0140676 A1 | 5/2016 | Fritze et al. | |
| 2016/0217225 A1 | 7/2016 | Bell et al. | |
| 2016/0260250 A1 | 9/2016 | Jovanovic et al. | |
| 2016/0286119 A1 | 9/2016 | Rondinelli | |
| 2016/0300385 A1 | 10/2016 | Bell et al. | |
| 2017/0034430 A1 | 2/2017 | Fu et al. | |
| 2017/0067739 A1 | 3/2017 | Siercks | |
| 2017/0194768 A1 | 7/2017 | Powers et al. | |
| 2017/0195654 A1 | 7/2017 | Powers et al. | |
| 2017/0263050 A1 | 9/2017 | Ha et al. | |
| 2017/0324941 A1 | 11/2017 | Birkler | |
| 2017/0330273 A1 | 11/2017 | Holt et al. | |
| 2017/0337737 A1 | 11/2017 | Edwards et al. | |
| 2018/0025536 A1 | 1/2018 | Bell et al. | |

(56) References Cited

U.S. PATENT DOCUMENTS

| | | | |
|---|---|---|---|
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hovden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hoyden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016/154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

GUIDE: 3D Virtual Tours, retrieved on Mar. 26, 2019, from https://goiguide.com/, 6 pages.

immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

IStaging | Augmented & Virtual Reality Platform for Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "How to Make a 3-D Model of Your Home Renovation Vision," in The New York Times, Feb. 13, 2019, retrieved Mar. 28, 2019, 6 pages.

Chen et al. "Rise of the indoor crowd: Reconstruction of building interior view via mobile crowdsourcing," in Proceedings of the 13th ACM Conference on Embedded Networked Sensor Systems, Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/ , on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved on Mar. 27, 2017 from http://geojournalism.org/2015/02/create-immersive-photo-experiences-with-google-photo-sphere/, 7 pages.

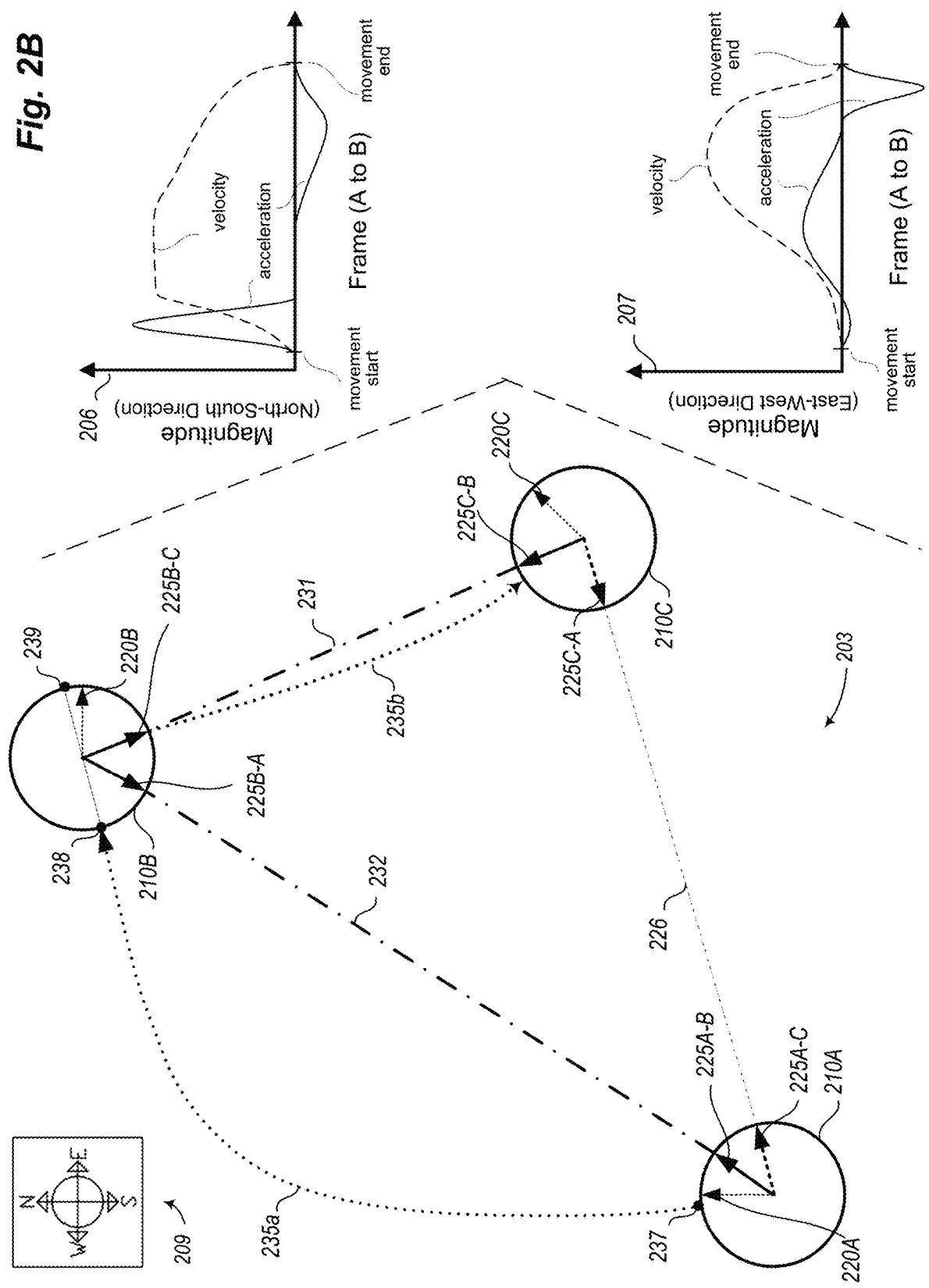

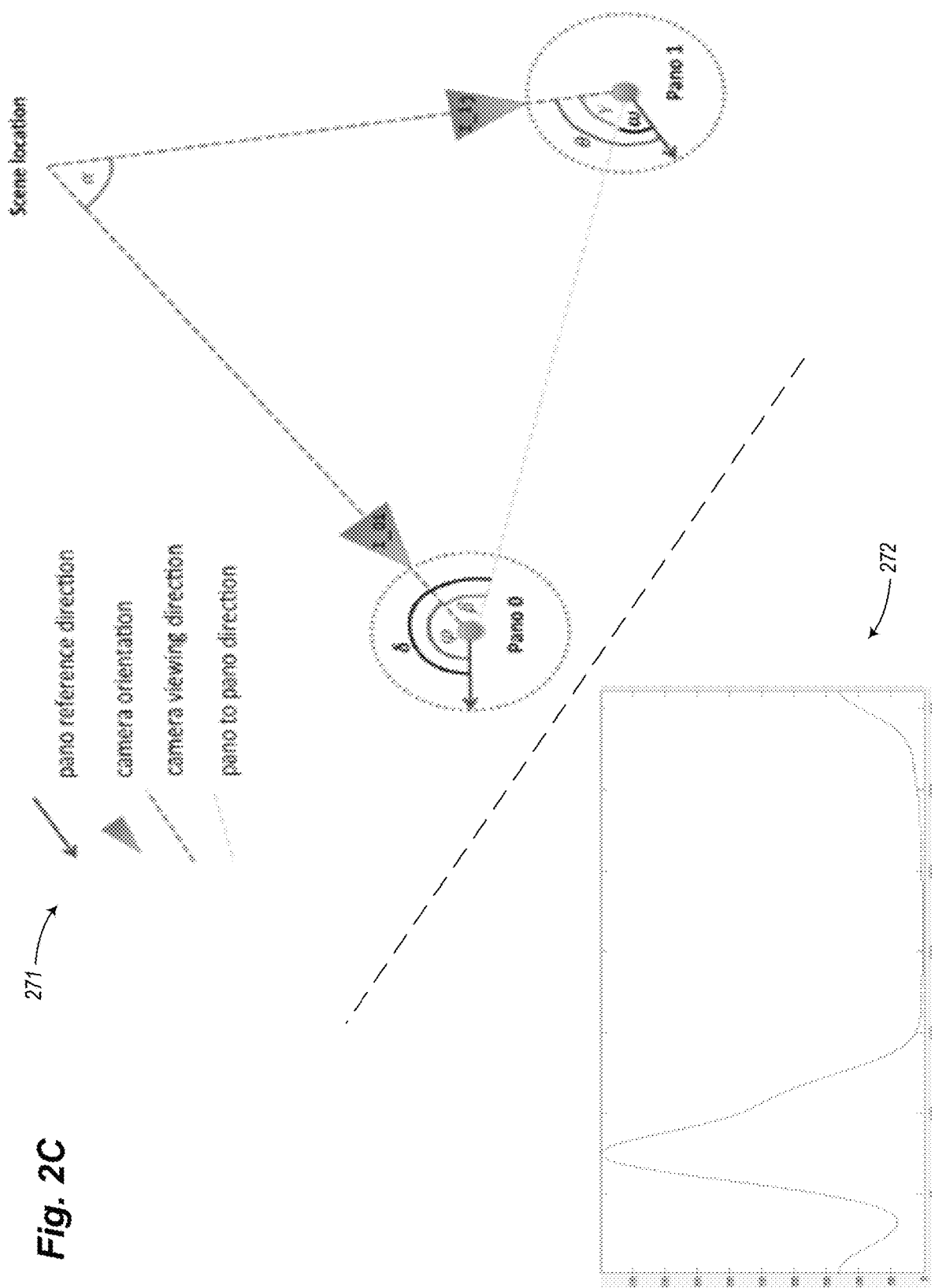

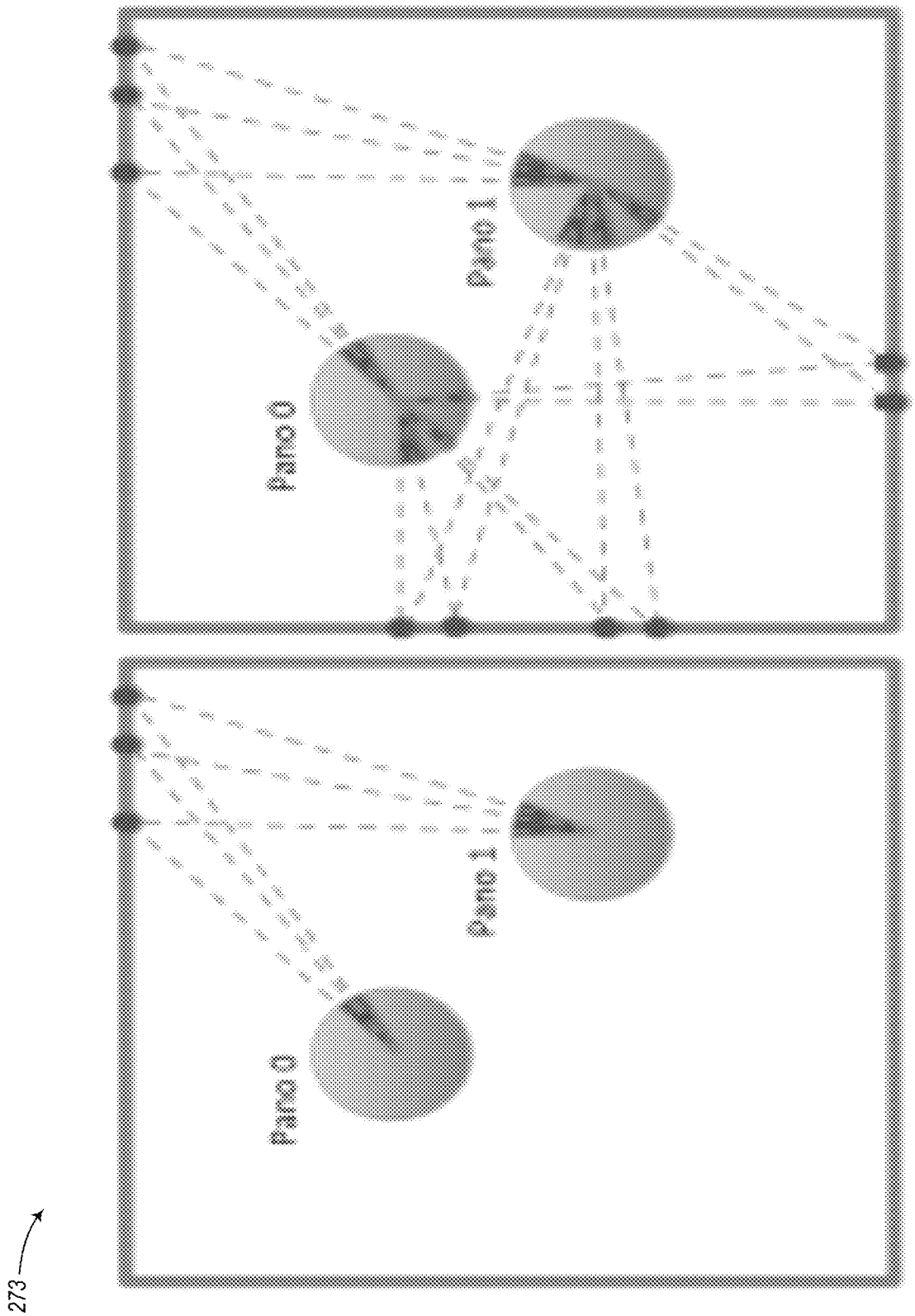

274

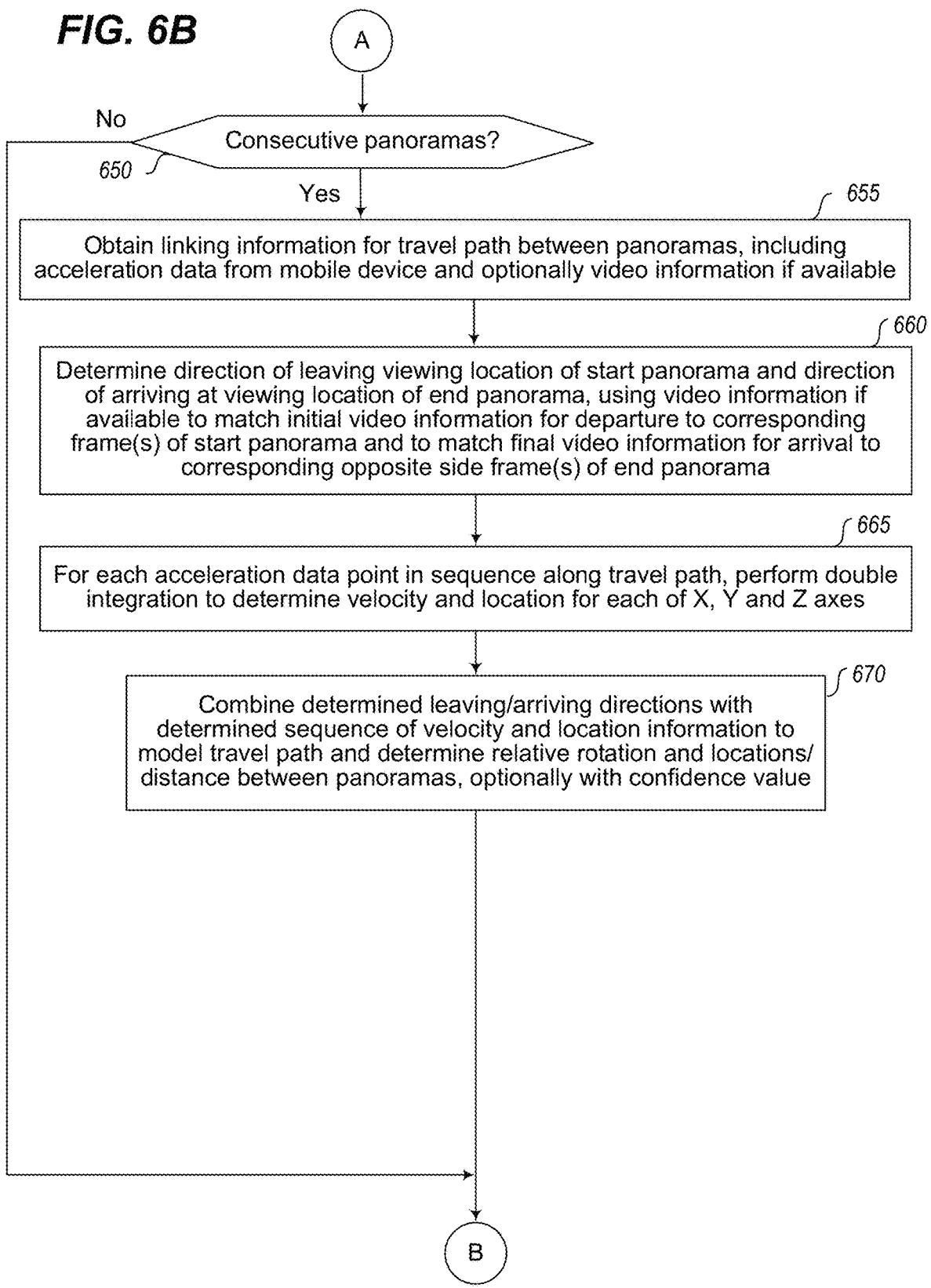

US 10,834,317 B2

CONNECTING AND USING BUILDING DATA ACQUIRED FROM MOBILE DEVICES

CROSS-REFERENCE TO RELATED APPLICATIONS

This application is a continuation of co-pending U.S. patent application Ser. No. 15/649,434, filed Jul. 13, 2017 and entitled "Connecting And Using Building Interior Data Acquired From Mobile Devices", which is hereby incorporated by reference in its entirety.

TECHNICAL FIELD

The following disclosure relates generally to techniques for analyzing and using information acquired from an interior of a building in order to generate and provide a representation of that interior, such as to analyze data from a mobile device that captures visual images of a house at multiple viewing locations in order to generate and present inter-connected panorama images of various locations within and surrounding the house.

BACKGROUND

In various fields and circumstances, such as real estate acquisition and development, property inspection, architectural analysis, general contracting, improvement cost estimation and other circumstances, it may be desirable to view the interior of a house, office, or other building without having to physically travel to and enter the building. While traditional still photographs of a building's interior may provide some understanding of that interior, it is difficult to fully understand the layout and other details of the interior from such photographs. However, it can also be difficult or impossible to accurately and efficiently capture more immersive types of visual information for building interiors, without spending significant time and using specialized equipment.

BRIEF DESCRIPTION OF THE DRAWINGS

FIGS. 2A-2E illustrate examples of analyzing and using information acquired from an interior of a building in order to generate and provide a representation of that interior.

FIGS. 6A-B depict a process flow for a panorama connection routine in accordance with an embodiment of the present disclosure.

DETAILED DESCRIPTION

Figure 1A:
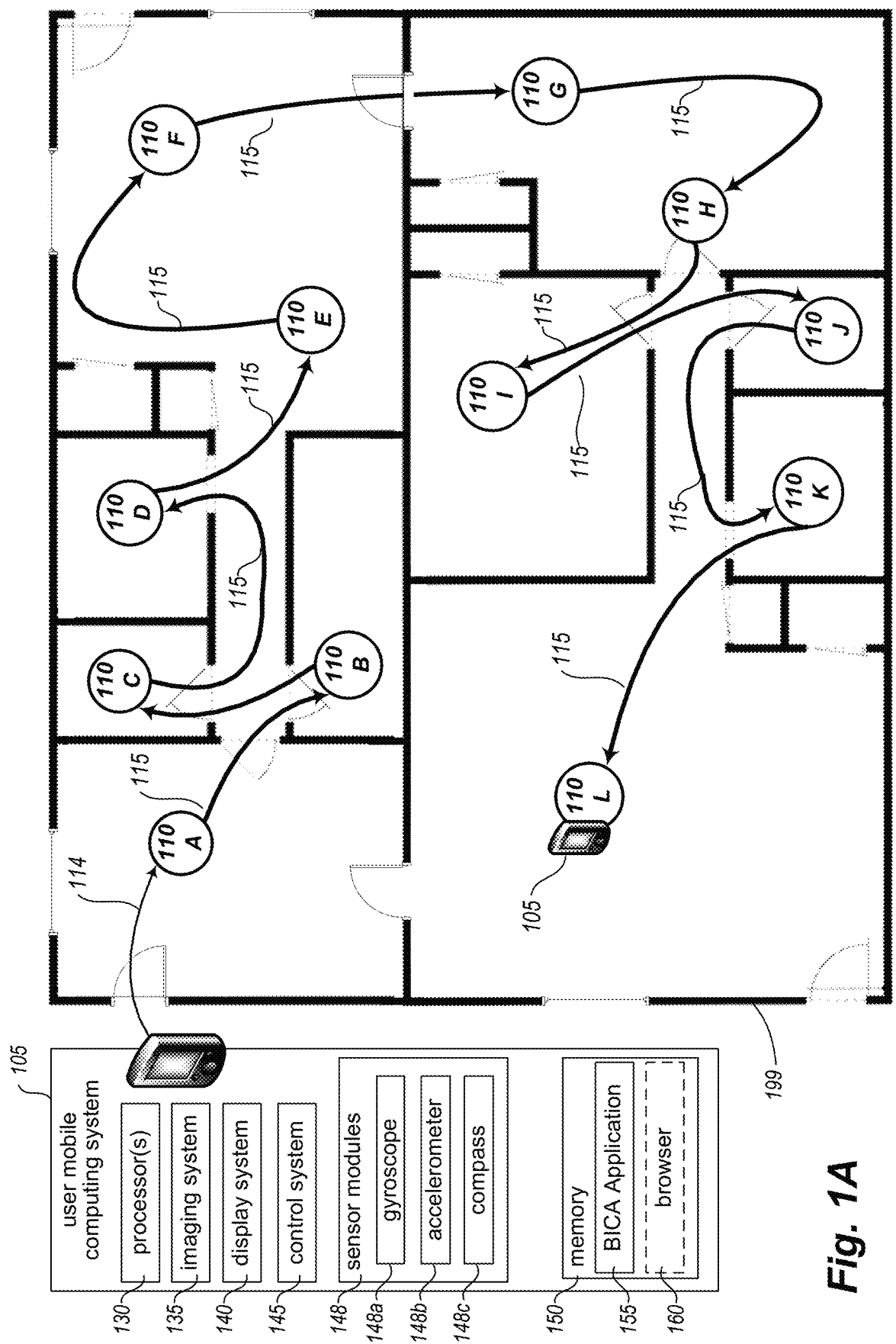
FIGS. 1A-1B are diagrams depicting an exemplary building interior environment and computing system(s) for use in embodiments of the present disclosure.

The present disclosure relates generally to techniques for one or more devices to perform automated operations involved in acquiring and analyzing information from an interior of a house, building or other structure, for use in generating and providing a representation of that interior. For example, in at least some such embodiments, such techniques may include using one or more mobile devices (e.g., a smart phone held by a user, a camera held by or mounted on a user or the user's clothing, etc.) to capture video data from a sequence of multiple viewing locations (e.g., video captured at each viewing location while a mobile device is rotated for some or all of a full 360 degree rotation at that viewing location) within multiple rooms of a house (or other building), and to further capture data linking the multiple viewing locations. The capturing of the data linking two successive viewing locations in the sequence may include, for example, capturing movement data (e.g., acceleration and other data from an IMU, or inertial measurement unit, of a mobile device) as a user with the mobile device walks or otherwise moves between the two viewing locations, as well as optionally recording video or other visual data for at least some of the user movement. After the viewing location videos and linking information are captured, the techniques may include analyzing video captured at each viewing location to create a panorama image from that viewing location that has visual data in multiple directions (e.g., a 360 degree panorama around a vertical axis), analyzing the linking information to determine relative positions/directions between each of two or more viewing locations, creating inter-panorama positional/directional links in the panoramas to each of one or more other panoramas based on such determined positions/directions, and then providing information to display or otherwise present multiple linked panorama images for the various viewing locations within the house. Some or all of the techniques described herein may be performed via automated operations of an embodiment of a Building Interior Capture and Analysis ("BICA") system, as discussed in greater detail below.

Thus, in at least some embodiments, one or more processor-based computing systems are used to capture and generate information regarding a building environment (e.g., interior, exterior and/or surroundings) based on recorded video information and/or sensor data captured by a mobile device at each of multiple viewing locations within the building interior, as well as based on sensor data (and possibly additional recorded video information) captured during movement of the mobile device between such arbitrary viewing locations. As used herein, the term "building" refers to any partially or fully enclosed structure, typically but not necessarily encompassing one or more rooms that visually or otherwise divide the interior space of the structure-non-limiting examples of such buildings include houses, apartment buildings or individual apartments therein, condominiums, office buildings, commercial buildings or other wholesale and retail structures (e.g., shopping malls and department stores), etc. The term "acquire" or "capture" as used herein with reference to a building interior, viewing location, or other location (unless context clearly indicates otherwise) may refer to any recording, storage, or logging of media, sensor data, and/or other information related to spatial and/or visual characteristics of the building interior or subsets thereof, such as by a recording device or by another device that receives information from the recording device. As used herein, the term "panorama image" refers to any visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. The term "sequence" of viewing locations, as used herein, refers generally to two or more viewing locations that are each visited at least once in a corresponding order, whether or not other non-viewing locations are visited between them, and whether or not the visits to the viewing locations occur during a single continuous period of time or at multiple different time periods.

For illustrative purposes, some embodiments are described below in which specific types of information are acquired and used in specific types of ways for specific types of structures and by using specific types of devices. However, it will be understood that such described techniques may be used in other manners in other embodiments, and that the invention is thus not limited to the exemplary details provided. As one non-exclusive example, various of the embodiments discussed herein include a mobile device being carried by a user while the mobile device captures various types of data, but in other embodiments one or more such mobile devices may move within some or all of a building interior in other manners, such as if carried by or integrated in an aerial or ground-based drone, robot or other autonomous, semi-autonomous and/or remotely controlled device with motion capabilities. As another non-exclusive example, while some illustrated embodiments include the linked panorama images representing or covering a single house or other structure, in other embodiments the linked panoramas may extend beyond a single such house or other structure, such as to include links to and panorama images of (or other visual representations of) an exterior environment associated with the structure (e.g., yard; pool; separate garages, sheds, barns, pool houses, boat houses, guest quarters or other outbuildings; etc.), of one or more other nearby houses or other structures (e.g., on a same city block), of nearby streets, roads and/or other areas, etc., as well as to include apartment buildings, office buildings, condominiums and other multi-tenant buildings or structures. As yet another non-exclusive example, while some illustrated embodiments include linking and presenting multiple panorama images, other embodiments may include linking and/or presenting other types of information (whether in addition to or instead of such panorama images), such as videos or other visual information from each of multiple viewing locations that are in forms other than panorama images, information based on infrared and/or ultraviolet and/or other non-visible light or energy (e.g., radiation levels; electromagnetic field, or EMF, levels; etc.), audio information from the environment surrounding a viewing location and/or from other sources (e.g., a recording user's annotations or other verbal descriptions), etc.—for example, short recordings of a noise level may be recorded at one or more recording locations within a building, such as under different conditions (e.g., with windows open, with windows shut, etc.), at different times, etc. As yet another non-exclusive example, while some illustrated embodiments include linked panoramas or other generated representation of a building interior (and/or other captured targets) on a display of client device to an end user, visual and/or audio and/or other information (e.g., haptic information) may be presented or otherwise provided to end users in other manners, such as part of an augmented reality ("AR") system (e.g., via specialized glasses or other head-mounted display) and/or a virtual reality ("VR") system (e.g., via specialized headgear and/or other output devices). In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

FIG. 1A depicts a block diagram of an exemplary building interior environment and mobile computing system in accordance with an embodiment of the present disclosure. In particular, FIG. 1A includes a building 199 with an interior to be captured by a user mobile computing system 105 (also referred to as a "mobile device" for this example) as it is moved through the building interior to a sequence of multiple viewing locations 110 by a user (not shown) via a travel path 115. A Building Interior Capture & Analysis ("BICA") system may automatically perform or assist in the capturing of the data representing the building interior, as well as further analyze the captured data to generate a visual representation of the building interior, as discussed further herein—in this example, the BICA system is executing as a local application 155 on the mobile device 105, although in other embodiments it may execute in part or in whole on one or more other computing systems (not shown) that are remote from the building 199, as discussed in greater detail with respect to FIG. 1B.

In the depicted embodiment, the mobile device 105 includes one or more hardware processors 130; one or more imaging systems 135, which include photographic and video recording capabilities; a display system 140, which includes a main display screen having a plurality of graphical display elements, and may further include other components of the mobile device (such as one or more light-emitting elements aside from the main display screen); a control system 145, such as to include an operating system, graphical user interface ("GUI"), etc.; and one or more sensor modules 148, which in the depicted embodiment include a gyroscope module 148a, an accelerometer module 148b, and a compass module 148c (e.g., as part of one or more IMU units of the mobile device). In other embodiments, the sensor modules 148 may include additional sensors, such as an altimeter module, light detection module, one or more microphones, etc., and other output modules (e.g., one or more speakers or audio output ports) may be provided. In at least some embodiments, the display system 140 may include a touchscreen component of the control system 145, such that at least some operations of the mobile device may be controlled by physical user interaction with elements of a graphical user interface presented via the display system. The mobile device as depicted further includes a memory 150, which in the illustrated embodiment is executing the BICA application 155, and may optionally also be executing a browser application 160, although in other embodiments the device that captures the video and/or other sensor data for the building interior may transfer the captured data to one or more other devices (not shown) executing a copy of the BICA application for analysis. In one or more embodiments, additional components or applications may also be executing within the memory 150 of the mobile device.

In operation, a user associated with the mobile device 105 enters the building interior 199 via travel path 114, arriving with the mobile device at a first viewing location 110A within a first room of the building interior. In response to one or more interactions of the user with the control system 145 of the mobile device, the BICA application initiates recording a first video of the building interior, capturing a view of the building interior from first viewing location 110A (e.g., some or all of the first room, and optionally small portions of one or more other adjacent or nearby rooms, such as through doors, halls or other connections from the first room) as the mobile device is rotated around a vertical axis at the first viewing location (e.g., with the user turning his or her body in a circle while holding the mobile device stationary relative to the user's body). In addition to recording video, the BICA application may monitor, and/or initiate concurrent recording of, various data provided by the sensor modules 148. For example, the BICA application may monitor a rotational speed of the mobile device via data provided by the gyroscopic module and/or accelerometer module; may associate with the recorded video a heading reported by the compass module at the time the video recording is initiated; etc. In certain embodiments, the BICA application may analyze one or more video frames captured during the recording process to determine and/or automatically correct issues regarding the recorded video, such as to correct or compensate for an undesirable level of exposure, focus, motion blur, or other issue.

In certain embodiments, the BICA application may provide real-time feedback to the user of the mobile device via one or more guidance cues during the recording of the first video of the building interior, such as to provide guidance for improving or optimizing movement of the mobile device during the recording process. For example, the BICA application may determine (such as based on sensor data provided by sensor modules 148) that the mobile device is rotating too quickly to record high quality video from the first viewing location, and if so may provide an auditory, visual, or other appropriate notification to indicate that the user should rotate the mobile device more slowly during the recording process. As another example, the BICA application may determine that the mobile device is shaking or otherwise failing to provide high quality video (such as based on sensor data or one or more analyses of particular captured video frames), and if so may provide a notification to advise the user of the problem. As still another example, in certain embodiments the BICA application may provide a notification to the user if it is determined that a particular viewing location is unsuitable for capturing information about the building interior, such as if the BICA application detects that lighting conditions or other environmental factors for the present viewing location are negatively affecting the recording process. In certain scenarios and embodiments, the BICA application may re-initiate the recording process once one or more conditions interfering with high-quality recording have been alleviated.

Furthermore, in certain embodiments the BICA application may prompt a user for information regarding one or more of the viewing locations being captured, such as to provide a textual or auditory identifier to be associated with a viewing location (e.g., "Living Room," "Office," "Bedroom 1" or other identifier), or to otherwise capture descriptive information from the user about the room (e.g., a description of built-in features, a history of remodels, information about particular attributes of the interior space being recorded, etc.). In other embodiments, such identifiers and/or other descriptive information may be determined in other manners, including automatically analyzing video and/or other recorded information for a building (e.g., using machine learning) for the determination. In at least one embodiment, such acquired or otherwise determined identifiers and/or other descriptive information may be later incorporated in or otherwise utilized with the captured information for a viewing location, such as to provide a textual or auditory indication of the identifier or other descriptive information during subsequent display or other presentation of the building interior by the BICA application or system (or by another system that receives corresponding information from the BICA application).

In one or more embodiments, the BICA application may further determine to modify one or more parameters of the imaging system 135 as part of improving quality of or otherwise improving some or all video recorded during capture of a building interior. For example, in certain scenarios the BICA application may automatically determine to use one or more of various exposure, aperture, and focus parameters; and may automatically adjust one or more parameters based on a type of lens or lenses used by the imaging system, such as if the imaging system includes multiple lenses of different focal lengths or to compensate for an atypical lens type (e.g., "fisheye," wide-angle, or telephoto lenses), and/or may use an external camera (e.g., a 360° camera that acquires data in at least 360° in a single frame or otherwise simultaneously). The BICA application may also optionally initiate presentation of user feedback (e.g., display of one or more GUI elements to the user; use of audio and/or tactile feedback, whether instead of or in addition to visual information, etc.) to suggest parameters of the imaging system for modification by the user in order to improve video recording quality in a particular embodiment or situation (e.g., if the BICA application is unable to automatically modify such parameters). In addition, in some embodiments, the capture of some or all of the video at one or more viewing locations may use additional equipment to assist in the capture, such as one or more of a tripod, additional lighting, a 3D laser scanner and rangefinder (e.g., using LIDAR) or other depth finder, an infrared emitter and/or detector, an ultraviolet emitter and/or detector, one or more external microphones, etc.

In various circumstances and embodiments, the BICA application may determine that multiple rotations of the mobile device at a viewing location are desirable to adequately capture information there. As non-limiting examples, the BICA application may determine to record video having a greater dynamic range, such as by initiating multiple rotations of the mobile device at different exposure values; or to capture a greater vertical arc of the building interior, such as by initiating multiple rotations of the multiple device with distinct z-angles (e.g., one rotation in a lateral direction that is approximately perpendicular to the vertical axis; another rotation in which the vertical angle of the device is raised above that perpendicular direction, such as to include at least some of the ceiling; another rotation in which the vertical angle of the device is lowered below that perpendicular direction, such as to include at least some of the floor; etc.). In such circumstances, the BICA application may provide one or more notifications or instructions to the user of the mobile device in order to indicate the desirability of such multiple rotations.

In at least some embodiments, at a time after initiating the recording of the first video of the building interior in the first room, the BICA application may automatically determine that the first viewing location 110A has been adequately captured, such as by determining that a full rotation of the mobile device has been completed, or that sufficient data is otherwise acquired. For example, the BICA application may determine that the reported heading of the mobile device has returned to or passed a heading associated with the beginning of the video recording, that the mobile device has rotated a full 360° since video recording was initiated, that the user has stopped rotation for a defined period of time (e.g., a small number of seconds, such as after being prompted by the BICA application to stop the rotation for that amount of time when the rotation is complete), etc. In at least some embodiments, the BICA application may provide one or more guidance cues to the user of the mobile device to indicate that a capture of the building interior from the first viewing location 110A is completed and that the user may proceed to additional viewing locations within the building interior. It will be appreciated that in certain scenarios, capture of a particular viewing location may not require a full 360° rotation of the mobile device in order to be adequately completed. For example, viewing locations in close proximity to walls or corners may be adequately represented by only a partial such rotation of the mobile device. Furthermore, in certain scenarios and embodiments, a BICA application or system may create a panorama image for a particular viewing location without the mobile device 105 completing a full rotation while recording video from that viewing location. In such scenarios, the BICA application or system may compensate for the partial rotation in various manners, including but not limited to: limiting a number of component images to include in the panorama image if a disparate quantity of video information is recorded from the viewing location for other portions of the building interior; generating one or more interpolated component images that do not wholly correspond to a single video frame recorded from the viewing location; or other manner, and with the resulting panorama image optionally being less than 360 degrees.

Continuing the example of FIG. 1A, once the first viewing location 110A has been captured in the first room, the mobile device 105 moves along travel path 115 as the user carries it to a next viewing location 110B, which in this example is in a different second room through 2 doors and an intervening hallway. As the mobile device is moved between viewing locations, the BICA application captures linking information that includes acceleration data associated with the movement of the mobile device, such as that received from accelerometer module 148b, and in certain embodiments may capture additional information received from other of the sensor modules 148, including to capture video or other visual information along at least some of the travel path in some embodiments and situations. In various embodiments, and depending upon specific configuration parameters of sensor modules 148, disparate quantities of acceleration data may be collected corresponding to movement of the mobile device along travel path 115. For example, in certain scenarios acceleration data and other sensor data may be received from the sensor modules at regular periodic intervals (e.g., 1000 data points a second, 100 data points a second, 10 data points a second, 1 data point a second, etc.), while other scenarios and/or sensor modules may result in such sensor data being received irregularly, or at varying periodic intervals. In this manner, the BICA application may receive greater or lesser quantities of acceleration data during travel of the mobile device between viewing locations depending on the capabilities and configuration of the particular sensor modules 148 included within the particular mobile device 105.

In one or more embodiments, the BICA application may further determine to terminate video recording for a viewing location in various manners (such as based on automatic detection of movement away from the viewing location, on one or more defined user preferences, on an explicit user request, on a full rotation of the mobile device or period of non-movement or other determination that the viewing location is adequately captured, etc. In other scenarios, the BICA application may continue video recording without termination between capturing video of a viewing location and subsequent movement of the mobile device along travel path 115—in such embodiments, the BICA application may associate with the captured video (either at the time of recording or during later analysis of such captured video, described elsewhere herein) one or more indications of demarcation ("markers" or "separation points") corresponding to a detected change between receiving sensor data indicative of rotation around a vertical axis (typically associated with capturing of a viewing location) and receiving sensor data indicative of lateral or vertical movement typically associated with movement between such viewing locations), optionally after a defined period of substantially no movement. The BICA application may further determine to maintain video recording until receiving an indication that all capture of a building interior has been completed (such as completion of video recording for a final viewing location within the building interior). It will be appreciated that during the course of multiple segments of movement through a building interior at and between multiple viewing locations, the BICA application may determine to maintain and utilize continuous video recording during all segments of such movement, one or more individual/contiguous segments of such movement, or no segments of such movement at all. In at least some embodiments, such determination may be based on one or more of defined user preferences, configuration parameters, available resources (such as storage capacity or other resources) of the mobile device 105, a quantity or type(s) of sensor data captured during such movement, or other factors.

In addition, and in a manner similar to the guidance cues and other instructions provided during capture of viewing location 110A, the BICA application may in certain embodiments provide guidance cues and other instructions to a user during movement of the mobile device between viewing locations. For example, in certain embodiments the BICA application may notify the user if such movement has exceeded a defined or suggested distance from the previous viewing location, or if the user is attempting to capture a next viewing location that is determined by the BICA application to be too close to the previous viewing location, or if the user is engaging in too much movement of a particular type (e.g., sideways rather than forward). Furthermore, in an manner analogous to video recording for a viewing location, the BICA application may determine to terminate video recording for a travel path between viewing locations in various manners (such as based on a period of non-movement at the end of the travel path or other determination that the travel path is adequately captured, on an explicit user request, on one or more defined user preferences, etc.).

Continuing the illustrated example of FIG. 1A, once the mobile device has arrived at the next viewing location 110B, the BICA application may determine to begin capture of the viewing location. If video is currently being recorded, the BICA application may associate with the captured video (either at the time of recording or during later analysis of such captured video) one or more markers corresponding to recording of a new viewing location (e.g., based on a determined period of non-movement after the movement to the new viewing location is completed; on a detected change in receiving sensor data indicative of lateral or vertical movement between viewing locations and receiving sensor data indicative of rotation around a vertical axis; etc.). If video is not currently being recorded, the BICA application may in certain embodiments automatically initiate such video recording upon detection that the user has begun to rotate the mobile device, in response to a user request to begin capturing the next viewing location (such as via one or more interactions of the user with the BICA application and/or imaging system 135 via the control system 145), or in other manners as previously noted.

In a manner similar to that described with respect to viewing location 110A, the BICA application captures viewing location 110B by recording video during rotation of the mobile device around a vertical axis at viewing location 110B, optionally modifying imaging system parameters and providing guidance cues or other instructions to the user of the mobile device in order to improve the recorded video associated with the viewing location. Upon determination that the viewing location 110B has been adequately captured (either automatically or in response to a user request as described above with respect to the capture of viewing location 110A), in certain embodiments the BICA application may receive a user request to terminate or to continue capture of the building interior, such as via one or more user interactions with a graphical user interface provided by the BICA application or in some other manner (e.g., user interaction with elements of control system 145). For example, in accordance with one or more embodiments and/or defined user preferences, the BICA application may determine to continue capture of the building interior unless a user request indicating otherwise is received; in other embodiments or in accordance with other defined user preferences, the BICA application may automatically terminate capture of the building interior unless and until user interaction is received indicating that one or more additional viewing locations (and linking information during movement to such additional viewing locations) is to be captured.

In the depicted embodiment of FIG. 1A, additional viewing locations 110C-110L, as well as linking information gathered during movement between such viewing locations, are captured by the BICA application as the user moves the mobile device 105 through building 199 interior along travel paths 115. Upon conclusion of capturing recorded video corresponding to rotation around a vertical axis located at a last viewing location 110L in the sequence, the BICA application determines to terminate (such as in response to a user request) the capture of the building interior. While the sequence of viewing locations and associated travel path do not include any overlap in this example (e.g., with one portion of the travel path crossing another portion of the travel path; one viewing location being the same as or overlapping with another viewing location, such as to have a loop in which the last viewing location is the same as the first viewing location or other viewing location; etc.), other embodiments and situations may include one or more such overlaps. Similarly, while the sequence of viewing locations are traveled in a continuous manner in this example, other embodiments and situations may include a non-contiguous path—as one non-limiting example, the user in FIG. 1A could stop after travelling from viewing locations 100A-110F, and complete the sequence by resuming at viewing location 110L and returning back to viewing location 110F along the intervening portion of the travel path 115 (resulting in a different order of viewing locations for the sequence than the one shown in FIG. 1A), whether substantially immediately or after an intervening period of time has passed.

In at least some embodiments, either immediately upon terminating the capture of building interior or at a later time, a panorama image is generated for each of viewing locations 110A-101L based on one or more analyses of the respective video recording corresponding to each such viewing location. Various operations may be performed on individual frames of such a video recording as part of generating a corresponding panorama image. Non-limiting examples of such operations include sharpening, exposure modification, cropping, integration of multiple exposures (such as if multiple rotations using distinct exposure parameters were used in order to expand a dynamic range of the recorded video, or instead one or more parameters are dynamically modified during a single rotation), deblurring (such as to compensate for detected motion blur), and selective discarding of particular video frames (such as based on a determination that such frames are out of focus, over- or under-exposed, duplicative of other video frames, or on other criteria). Once the individual frames of the video recording have been selected and modified in accordance with the operations described above, the resulting images are stored by the BICA system as a single panorama image, such as to include multiple navigable component images.

In addition to generating panorama images corresponding to each of the viewing locations within the building interior, analysis of the linking information corresponding to each segment of travel path 115 is performed in order to determine relative positional information between at least successive pairs of viewing locations along that travel path. In particular, acceleration data corresponding to each such segment is analyzed to determine, for example, a relative location of viewing location 110B with respect to previous viewing location 110A (and vice versa), with viewing locations 110A and 110B being a first pair of successive viewing locations; a relative location of viewing location 110C with respect to previous viewing location 110B (and vice versa), with viewing locations 110B and 110C being a second pair of successive viewing locations; and so on. In at least some embodiments, additional sensor data may be considered during such analysis. For example, for building interiors encompassing multiple floors or other elevations, in addition to analyzing vertical acceleration data to determine a relative vertical distance between viewing locations, the BICA system may additionally make such determination based on available altimeter data, gyroscopic data, etc. In addition, recorded video captured as part of the linking information or as part of capturing a particular viewing location may be analyzed as part of determining the relative positional information. For example, in certain embodiments individual video frames within separate segments of recorded video, corresponding to video recorded from separate viewing locations, may be analyzed to determine similarities between such video frames—for example, one or more video frames recorded as part of capturing viewing location 110E may be compared with one or more additional video frames recorded as part of capturing viewing location 110F as part of determining relative positional information regarding those viewing locations, as discussed in greater detail with respect to FIG. 2A. It will be appreciated that while analysis of the linking information may only directly result in relative positional information between successive viewing locations along travel path 115 (e.g., between viewing locations 110D and 110E, or viewing locations 110G and 110H), a full analysis of such linking information may in certain embodiments indirectly result in the BICA system determining relative positional information between additional viewing locations as well (e.g., between viewing locations 110I and 110G, or viewing locations 110B and 110L), as discussed in greater detail with respect to FIG. 2B.

In one or more embodiments, generating a panorama image for a viewing location may include determining one or more component images to use as primary component images of the panorama image, such as to initially display when the panorama image is first presented to a user. Various criteria may be utilized by the BICA system when determining primary component images for a generated panorama image, including as non-limiting examples: a component image that includes a view of a quantity of other viewing locations within the building interior; a component image determined to be of higher quality than other component images within the generated panorama image (such as based on a depth of field, exposure, lighting quality, or other attribute); etc.—thus, selection of a primary component image may be unrelated to the sequence of video frames originally recorded from the viewing location corresponding to the generated panorama image. In certain scenarios and embodiments, multiple primary component images may be selected when generating a panorama image, such as to reflect a respective direction from which a viewer might arrive at the corresponding viewing location from other viewing locations within the building interior. With reference to FIG. 1A, for example, the BICA system may determine to select a first primary component image of the panorama image for viewing location 110E that corresponds to the perspective of a viewer arriving from viewing locations 110A or 110D (i.e., an image based on video recorded while the mobile device 105 was facing approximately away from viewing location 110D), and may determine to select a second primary component image of the 110E panorama image that corresponds to the perspective of a viewer arriving from viewing location 110F (i.e., an image based on video recorded while the mobile device 105 was facing approximately toward the wall of the room in the direction of viewing location 110I).

In the depicted embodiment of FIG. 1A, the generation of the panorama images and determination of relative positional information is performed locally by the one or more processors 130 via BICA application 155 executing in memory 150 of the mobile device 105. In various embodiments, some or all of such processing may be handled by one or more remote server computing systems executing an embodiment of a Building Interior Capture and Analysis system, as discussed in greater detail with respect to FIG. 1B below.

Figure 1B:
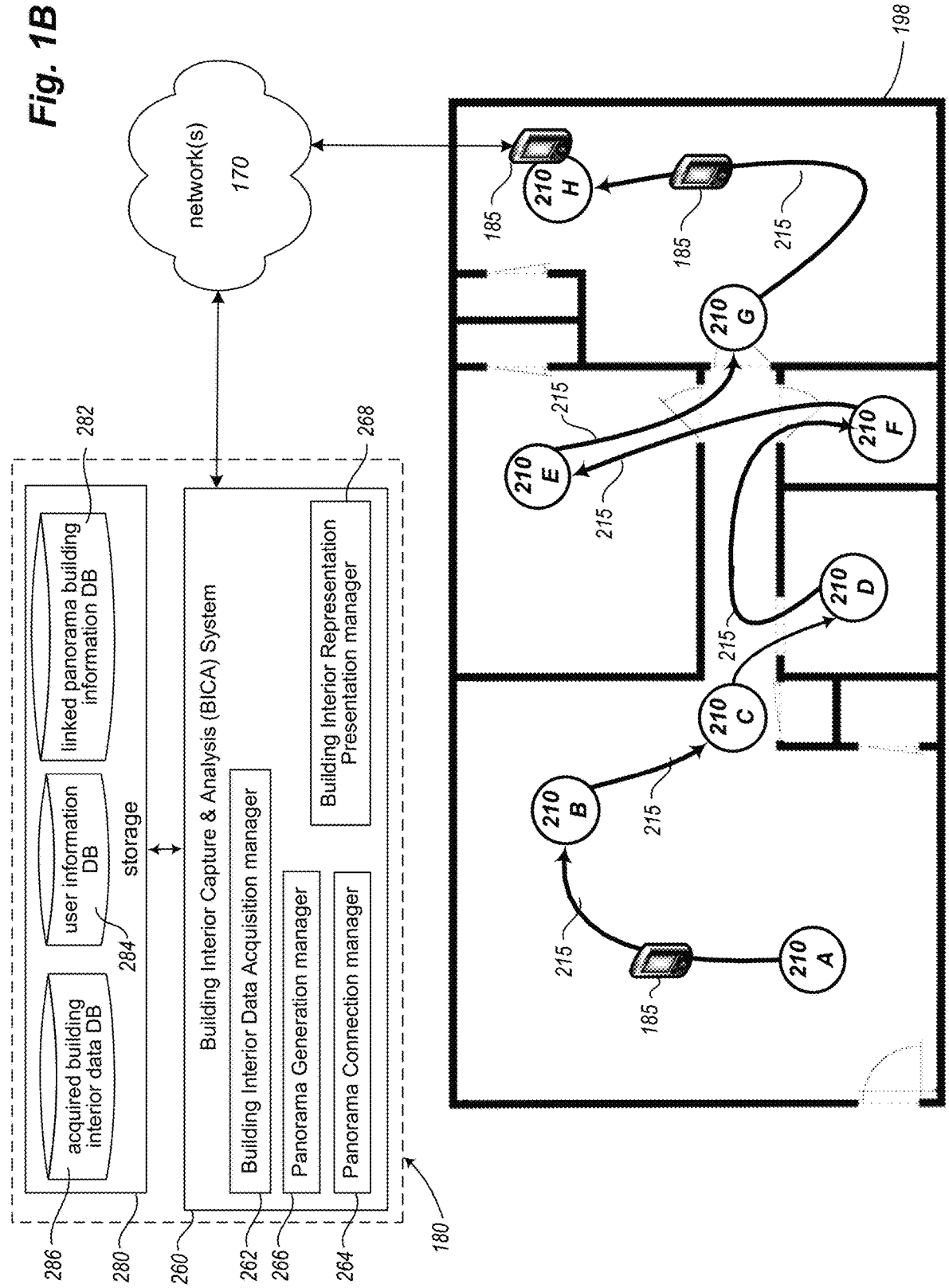

FIG. 1B is a schematic diagram of an additional exemplary building interior environment being captured via embodiments of a BICA system. In particular, in the depicted embodiment of FIG. 1B, a mobile device 185 (optionally executing an embodiment of a BICA client application) is utilized to capture each of multiple viewing locations 210A-210H within the interior of building 198, as well as to capture associated linking information during movement of the mobile device 185 between such viewing locations. In addition, the depicted embodiment of FIG. 1B further includes a remote BICA server system 260 and associated storage 280, details and operations of which are further described below.

In a manner similar to that described with respect to building 199 of FIG. 1A, during capture of the interior of building 198, the BICA application (e.g., a local client application executing on mobile device 185, the remote BICA system 260 via communication over the network(s) 170, etc.) provides guidance cues and manages video recording while a user of the mobile device rotates the mobile device around a vertical axis at each of a sequence of viewing locations 210A-210H. Furthermore, and also in a manner similar to that described with respect to building 199 of FIG. 1A, the BICA application captures linking information during movement of the mobile device between the viewing locations 210 along travel path 215. In the depicted embodiment of FIG. 1B, the captured linking information includes sensor data provided by sensor modules of the mobile device (including acceleration data) and further includes additional video recording captured during such movement.

Following the capture of a last viewing location 210H in the sequence, the BICA application receives an indication from the user that capture of the building 198 interior is complete. In the depicted embodiment of FIG. 1B, the captured information regarding building 198 is transferred for processing to the remote BICA system 260 via one or more computer networks 170 (e.g., as initiated by a local BICA client application, if any, on the mobile device; as initiated by a user of the mobile device; as initiated by the remote BICA system 260, such as periodically or as is otherwise initiated; etc.). In various embodiments, such contact and ensuing information transmission may be performed at various times. For example, the BICA application may allow the user to schedule the transmission for a specified time, such as to conserve battery power for the mobile device 185 by restricting transmissions to time periods in which the mobile device is externally powered, or to delay transmitting until a particular network connection is available (e.g., in order to utilize a local Wi-Fi connection for such transmission rather than a cellular network connection, such as to lessen or remove the impact of the transmission on a limited "data plan" of the user), or to delay transmitting until the mobile device is docked or otherwise can use a non-wireless physical connection.

In certain scenarios and embodiments, portions of the captured information for a building interior may be transmitted at different times for subsequent processing. For example, video recordings captured at some or all of the viewing locations for a building interior may be transmitted independently of any linking information captured during movement of the mobile device between such viewing locations, or vice versa. As another example, one or more portions of captured information for a building interior may be transmitted prior to fully completing the capture of all viewing locations within that building interior, such as to enable the remote BICA system 260 to generate corresponding panorama images for such viewing locations concurrently with the capture of additional building interior information, to determine relative positional information for certain viewing locations concurrently with the capture of additional building interior information, and/or to analyze the transmitted portions of the captured information to determine and provide notification of any problems with those transmitted portions. In this manner, the BICA system may provide a notification to the user that one or more of the viewing locations should be recaptured while the user is still within the building interior, such as if the BICA system determines during processing of the corresponding video recordings for those viewing locations that such video recordings are of insufficient or undesirable quality to serve as the basis for generating a panorama image, or do not appear to provide complete coverage of the building (e.g., if only 1 of 3 expected bathrooms have been captured, such as based on a floor plan or other information that is available about the building).

In the depicted implementation of FIG. 1B, the BICA system 260 includes a Building Interior Data Acquisition manager 262 (for managing the acquisition, receipt and storage of captured media, sensor data, and other information related to building interiors); a Panorama Generation manager 266 (for managing analysis of received media, including generation of panorama images for viewing locations based on received video data); a Panorama Connection manager 264 (for managing analysis of received sensor data and other information, including to determine relative positional information regarding related viewing locations of a building interior); and Building Interior Representation Presentation manager 268 (for presenting linked panoramas or other generated representations of building interiors, such as via a GUI provided by the BICA system, or for otherwise providing such information to other systems for display, such as via an API, or application programming interface, not shown, provided by the BICA system for programmatic access by remote executing software programs). The BICA system is communicatively coupled (locally or remotely) to storage facility 280, which includes database 286 with acquired building interior data (e.g., videos or other visual information for viewing locations; linking information between viewing locations, such as video data and/or other sensor data; etc.), database 282 with generated linked panorama building information, and user information database 284 with various user-specific information (e.g., user preferences). In certain implementations, the storage facility 280 may be incorporated within or otherwise directly operated by the BICA system; in other implementations, some or all of the functionality provided by the storage facility may be provided by one or more third-party network-accessible storage service providers (e.g., via network 170 and/or one or more other intervening networks, not shown).

Continuing the example of FIG. 1B, processing of the captured information regarding the building 198 interior is performed in a manner similar to that described with respect to the processing of captured information regarding the building 199 interior of FIG. 1A. In particular, a panorama image is generated for each of viewing locations 210A-210H based on one or more analyses of the respective video recording corresponding to each such viewing location, with various operations performed on individual frames of each such video recording as part of generating a corresponding panorama image. Analysis of the linking information corresponding to each segment of travel path 215 is performed in order to determine relative positional information between successive viewing locations 210 along that travel path, including an analysis of acceleration data (and any additional sensor data) corresponding to each such travel path segment to determine a relative location of viewing location 210B with respect to previous viewing location 210A; a relative location of viewing location 210C with respect to previous viewing location 210B; and so on, as further discussed with respect to FIGS. 2A-2B.

In various scenarios and embodiments, specific aspects of the processing of the captured information may be performed by the remote BICA system 260, by a local BICA client application (not shown) executing on mobile device 185, or both. For example, the local BICA client application may analyze captured sensor data in order to insert one or more markers into corresponding video information recorded during capture of the building interior, such as to separate the recorded video information into portions respectively corresponding to the capture of each viewing location within the building interior and other portions respectively corresponding to the capture of linking information during movement between those viewing locations. In this manner, transmission and/or analysis of the captured information may be performed in an apportioned manner rather than as a single unit. As another example, the remote BICA system 260 may generate a panorama image for each of the viewing locations within a building interior, while a local BICA client application executing on mobile device 185 may analyze the captured linking information in order to determine relative locations for such viewing locations, or vice versa. It will be appreciated that in various embodiments, any combination of local and remote processing of the captured information regarding a building interior may be performed by one or both of the remote BICA system and local BICA client application, or that instead only one of the remote and local applications may be used.

In the depicted computing environment 180 of FIG. 1B, the network 170 is one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, in this illustrated example of FIG. 1B, users may utilize client computing systems and/or other client devices (such as mobile device 185) to interact with the BICA system 260 to obtain various described functionality via the network 170, and in doing so may provide various types of information to the BICA system. Moreover, in certain implementations, the various users and providers of the networked environment 180 may interact with the BICA system and/or one or more other users and providers using an optional private or dedicated connection.

Again with reference to FIG. 1B, once respective panorama images have been generated for each of the viewing locations 210A-210H and relative positional information with respect to those viewing locations has been determined (e.g., one or more of location, distance, rotation relative to a viewing location's panorama image's starting point or other direction information, etc.), the BICA system 260 generates a presentation of the building 198 interior based on the respective panorama images and relative positional information to create a group of linked panorama images. In particular, based on the relative positional information, the BICA system associates each panorama image (which corresponds to a single one of viewing locations 210) with additional information reflecting one or more links to one or more other of the viewing locations. For example, in the depicted embodiment, the BICA system might associate the generated panorama image corresponding to viewing location 210G with links respectively associated with each of viewing locations 210C, 210E, 210F, and 210H. In certain embodiments, the BICA system may determine to associate a panorama image with links corresponding to each additional viewing location within the building interior that satisfy one or more defined criteria. As non-limiting examples, such criteria for associating a link may include whether the viewing location corresponding to the link is visible at least in part from the viewing location that corresponds to the panorama image; whether the viewing location corresponding to the link is within a defined proximity to the viewing location that corresponds to the panorama image; whether sufficient information is available to determine the relative position or direction of the viewing location from the viewing location that corresponds to the panorama image; or other suitable criteria. Note that, as described above with respect to the generated panorama image corresponding to viewing location 210G, link may be associated with a panorama image such that the associated links include links corresponding to viewing locations other than those that were consecutively captured during the original capture process—for example, during the capture of building 198 interior, viewing location 210G was immediately preceded along travel path 215 by viewing location 210E and immediately followed by viewing location 210H, and yet links may be associated for the 210G panorama image that correspond to any or all of viewing locations 210A, 210B, 210C, 210D, and 210F as well.

In certain embodiments, generating a presentation of the building 198 interior may include determining an initial panorama image to display as a "starting point" of the presentation. It will be appreciated that the initial panorama image selected by the BICA system may or may not correspond to the first viewing location for the original capture of the building interior (i.e., viewing location 210A for the building 198 interior in FIG. 1B). For example, the BICA system may determine to designate an initial panorama image that corresponds to a viewing location visible from the most other viewing locations within the building interior; that corresponds to a viewing location within a particular type of room within the building interior (e.g., a building lobby, and entryway, a living room, a kitchen, or other type); that corresponds to a viewing location within a room of the building interior that appears to encompass a greatest square footage; or that corresponds to a viewing location satisfying other defined criteria.

In addition to the automated generation of the representation of the building 198 interior (including generation of panorama images and determination of inter-panorama links based on determined relative position information between corresponding viewing locations), the described techniques may in at least some embodiments include enabling the user carrying the mobile device and/or one or more other users (e.g., operators of the BICA system 260) to modify the generated representation of the building interior in various manners, such as via a corresponding GUI provided by the BICA system. Such modification may include, for example, adding, deleting and/or changing determined inter-panorama links (e.g., to adjust links to pass through doorways or other passages between rooms rather than through walls; to add or remove links corresponding to end user expectations of related viewing locations; etc.). In addition, such modification may further include other changes, such as changing panorama images (e.g., removing a panorama image if its viewing location is not useful or if there are other problems with the panorama image; selecting a new starting image/direction in a panorama image when it is initially displayed; selecting a new starting panorama image to display for the building interior; etc.), adding or otherwise modifying textual and/or audio annotations or descriptions for particular panoramas images and/or inter-panorama links, etc.

Once a presentation for a building interior is generated, the BICA system stores the presentation for future use (e.g., in linked panorama building information database 282 or other component of storage 280 as depicted within FIG. 1B), such as to respond to one or more later requests to display the presentation for a specified building interior that has been previously captured. For example, in response to a request from an end user to display a presentation for building 198 interior, the BICA system 260 may retrieve the relevant presentation information from storage 280 and selectively transmit some or all of such presentation information to a client computing system (not shown) of the end user (such as via network 170). In so doing, the BICA system provides information that causes the client computing device to display an initial panorama image corresponding to a determined first viewing location within the building interior—for example, viewing location 210C may be selected as the first viewing location for the presentation, with an initial primary component image of the panorama image associated with viewing location 210C being displayed to the end user.

In at least some embodiments, the display of the panorama image is performed in a user-navigable manner, such as to allow the user to determine a sequence, direction, and/or rate of display of additional component images of the generated panorama image. For example, in certain embodiments the user may navigate the panorama image by using an input device (a mouse, touchscreen, virtual-reality display, or other input device) to selectively "turn" within the panorama image, such that the BICA system causes the client computing system to display one or more additional component images or other portions of the panorama image in accordance with the received user input. In addition, the presentation as a whole is navigable by the user via selection of the respective link information associated with one or more other viewing locations (and other corresponding panorama images) by the BICA system when generating the presentation information—in this manner, the user may navigate the entirety of the presentation for a building interior via selection of displayed link during display of panorama images, such as to initiate display by the BICA system of other corresponding panorama images associated with other viewing locations within the building interior to which the selected links correspond.

Figure 2A:
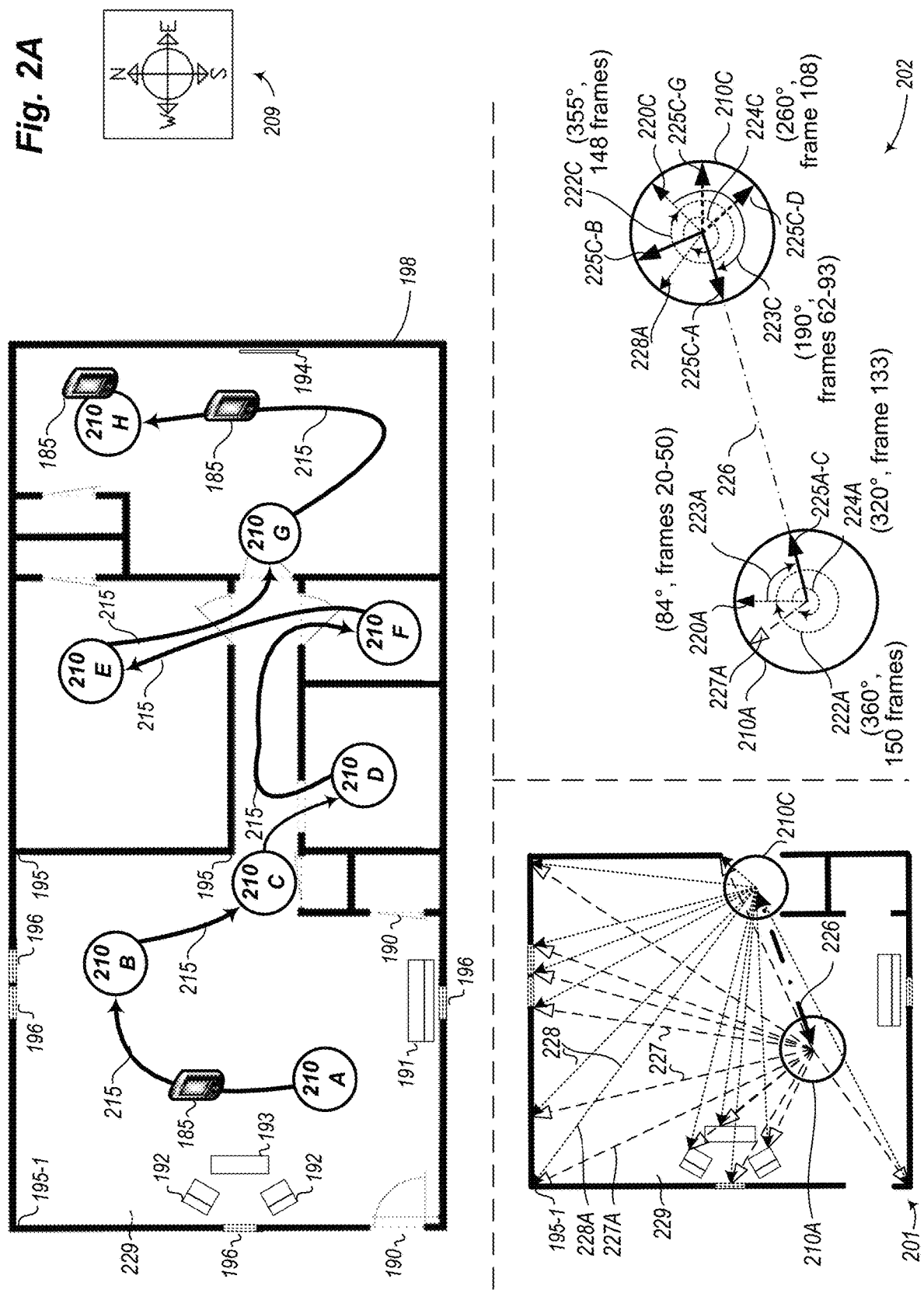

FIGS. 2A-2B illustrate examples of analyzing and using information acquired from an interior of a building in order to generate and provide a representation of that interior, including to determine relative positional information between the viewing locations for use in inter-connecting panorama images or other visual information corresponding to those viewing locations.

In particular, FIG. 2A illustrates building 198 in a manner similar to that illustrated in FIG. 1B, but with additional information shown in room 229 of the building that may be of use in determining connections between panorama images for different viewing locations. In the example of FIG. 2A, the room 299 includes various structural details that may be visible in images (e.g., video frames) captured from viewing locations (e.g., viewing locations within the room 229, such as 210A, 210B, and/or 210C), such as multiple doorways 190 (e.g., with swinging doors), multiple windows 196, multiple corners or edges 195 (including corner 195-1 in the northwest corner of the building 198, as shown with respect to directional indicator 209), etc. In addition to the structural information in the room 229, the illustrated example further includes additional furniture and other contents in the room 229 that may similarly be used in matching at least some images from different viewing locations, such as a couch 191, chairs 192, a table 193, etc. Furthermore, the building 198 in this example also includes an object 194 on the eastern wall of the building 198, such as may be visible from viewing location 210C (e.g., corresponding to a painting, picture, television, etc.). It will be appreciated that other structural and/or non-structural features may be present and used in image matching in other buildings in other embodiments.

In addition to building 198, FIG. 2A further includes information 201 and 202 to demonstrate examples of using information about overlapping features in frames from two panorama images at two viewing locations in order to determine inter-connection information for the panorama images. In particular, information 201 further illustrates room 229 and how features in the room may be used for image matching for viewing locations 210A and 210C, such as based on structural and/or contents (e.g., furniture) features of the room. As non-exclusive illustrative examples, Information 201 illustrates viewing directions 227 from viewing location 210A that each has an associated frame in the panorama image for that viewing location, with the illustrated viewing directions 227 corresponding to various features in the room 229. Similarly, information 201 also illustrates viewing directions 228 from viewing location 210C that each has an associated frame in the panorama image for that viewing location, with the illustrated viewing directions 228 corresponding to the same features in the room 229 as the viewing directions 227. Using feature 195-1 in the northwest corner of the room 229 as an example, a corresponding viewing direction 227A and associated frame in the direction of that feature from viewing location 210A is shown, and a corresponding viewing direction 228A and associated frame from viewing location 210C to that feature is also shown—given such matching frames/images to the same feature in the room from the two viewing locations, information in those two frames/images may be compared in order to determine a relative rotation and translation between viewing locations 210A and 210C (assuming that sufficient overlap in the two images is available). It will be appreciated that multiple frames from both viewing locations may include at least some of the same feature (e.g., corner 195-1), and that a given such feature may include additional information to that feature (e.g., portions of the west and north walls, the ceiling and/or floor, possible contents of the room, etc.)—for the purpose of this example, the pair of frames/images being compared from the two viewing locations corresponding to feature 195-1 may include the image/frame from each viewing location with the largest amount of overlap, although in actuality each image/frame from viewing location 210A in the approximate direction of 227A that includes any of corner 195-1 may be compared to each image/frame from viewing location 210C in the approximate direction of 228A that includes any of corner 195-1 (and similarly for any other discernible features in the room).

Information 202 of FIG. 2A provides further illustration of how the frames/images in directions 227A and 228A may be used, along with the other matching frames/images between the two viewing locations, in order to determine inter-panorama directions and links to connect the panorama images for the two viewing locations. In particular, information 202 includes representations of viewing locations 210A and 210C, illustrating the directions 227A and 228A from those viewing locations to the structural feature 195-1 of the room 229. The viewing location 210A representation further illustrates that the video capture of information for the panorama image from viewing location 210A begins in direction 220A and, as shown in the information 222A, proceeds in a clockwise manner corresponding to a 360° full rotational turn around a vertical axis, resulting in 150 frames/images being acquired from the viewing location 210A (e.g., 6 frames per second, if the full 360° rotation takes 25 seconds, although other amounts of rotation time and/or frames per second may be used in other situations, such as faster or slower rotation times and/or more or less frames per second). After determining the image/frame of the panorama image for viewing location 210A that includes the feature 195-1 for the purpose of the image/frame matching in this example, information 224A further illustrates that the image/frame is frame 133 of the 150 frames, and it is 320° from the beginning direction 220A. In a similar manner, the visual information captured from viewing location 210C begins in direction 220C, and, as shown in information 222C, proceeds in an almost full rotation around a vertical axis at that viewing location, corresponding to 355° of rotation and 148 frames/images captured. After determining the image/frame of the panorama image for viewing location 210C that includes the feature 195-1 for the purpose of the image/frame matching in this example, information 224C further illustrates that the image/frame is frame 108 of the 148 frames, and it is 260° from the beginning direction 220C.

Based on the analysis of the matching pair of frames/images, the relative rotation between the directions 227A and 228A may be used to determine that the viewing locations 210A and 210C are located in direction 226 from each other (shown in this example as a single 2-way direction, such as to include a direction 226a, not shown, from viewing location 210A to viewing location 210C, and an opposite direction 226B, also not shown, from viewing location 210C to viewing location 210A), as well as a distance (not shown) for the translation between the viewing locations. Using the determined direction 226, a corresponding inter-panorama link 225A-C is created (in direction 226a) for the panorama image from viewing location 210A to represent viewing location 210C and its panorama image, with information 223A indicating that the resulting rotation from starting direction 220A is 84° and is centered at frame 35 of the 150 frames (with 15 frames in each direction also including viewing location 210C, resulting in frames 20-50 of viewing location 210A's panorama image including a displayed inter-panorama link in direction 226a to the associated panorama image for viewing location 210C). Similarly, using the determined direction 226, a corresponding inter-panorama link 225C-A is created (in direction 226b) for the panorama image from viewing location 210C to represent viewing location 210A and its panorama image, with information 223C indicating that the resulting rotation from starting direction 220C is 190° and is centered at frames 77 and 78 of the 148 frames (with 15 frames in each direction also including viewing location 210A, resulting in frames 63-93 of viewing location 210C's panorama image including a displayed inter-panorama link in direction 226b to the associated panorama image for viewing location 210A).

While the direction 226 is discussed in information 202 with respect to a single pair of frames 133 and 108 (from viewing locations 210A and 210C, respectively), it will be appreciated that viewing locations such as 210A and 210C in a single room (or otherwise with direct viewing information to each other) will typically have numerous pairs of matching frames/images that each include overlapping information, and may each be used to similarly determine respective values for the relative positional rotation and translation between the two viewing locations (such as based on the directions 227 and 228 in information 201 as a small example subset of matching frames/images). As discussed in greater detail below, the information from multiple such matching frames/image pairs may be combined in order to determine an overall relative rotation and translation between the two viewing locations, with the confidence in the resulting overall values typically growing as the number of matching frames/images to be analyzed increases. In other embodiments, image mapping may be performed using only structural features, only furniture or other objects within a room, and/or one or both of those types of information in combination with other additional types of feature information that are discernible in images from different locations.

The example information 202 further illustrates additional inter-panorama connections to other viewing locations from viewing location 210C that may be determined based on overlapping corresponding matching frames/images from viewing location 210C and those other viewing locations, with resulting generated inter-panorama links being shown. In particular, the additional inter-panorama links include an inter-panorama link 225C-B in a determined direction to viewing location 210B, an inter-panorama link 225C-D in a determined direction to viewing location 210D (e.g., if sufficient image overlap is available for images from both viewing locations along the north wall of the hallway moving east-west through the building 198), and an inter-panorama link 225C-G in a direction to viewing location 210G (e.g., if sufficient information overlaps in the images from the two viewing locations along that hallway, along the eastern wall of the building 198 where object 194 is present, and/or along the western wall of the building to include images of chairs 192, table 193, and nearby window 196). While it is possible that sufficient overlap may be present from other viewing locations to that of viewing location 210C to enable relative positional information to be determined from overlapping image information, such as for one or more of viewing locations 210E, 210F, and/or 210H, the general lack of overlap in visual information from the respective viewing locations may prevent such a determination using that information in the current example, and one or both of viewing locations 210D and 210G may similarly lack sufficient information to determine their respective inter-panorama links (or to determine the directions for such inter-panorama links with only low confidence values). Also, while viewing location 210A includes only a single inter-panorama link 225A-C in information 202 in this example, it will be appreciated that an additional inter-panorama link between viewing locations 210A and 210B may be determined in a manner similar to that discussed with respect to that of viewing locations 210A and 210C.

FIG. 2B continues the example of FIG. 2A, and in particular illustrates information 203 regarding similar types of inter-panorama rotation and distance information that may be determined corresponding to the viewing locations from which the panorama images are taken, but with the determination in FIG. 2B being based on analyzing linking information corresponding to a travel path that a user takes between viewing locations (whether in addition to or instead of using connection information determined from image/frame mapping as discussed with respect to FIG. 2A).

In particular, the information 203 of FIG. 2B illustrates viewing locations 210A, 210B, and 210C, and also shows travel path information 235a indicating a path of the user moving from viewing location 210A to viewing location 210B, and travel path information 235b indicating a path of the user subsequently moving from viewing location 210B to 210C. It will be appreciated that the order of obtaining the linking information may vary, such as if the user instead started at viewing location 210B and captured linking information as he or she traveled along path 235b to viewing location 210C, and later proceeding from viewing location 210A to viewing location 210B along travel path 235a with corresponding linking information captured (optionally after moving from viewing location 210C to 210A without capturing linking information). The information 203 includes some of the information 202 previously illustrated in FIG. 2A, and includes some additional information (e.g., regarding viewing location 210B), but some details are omitted in FIG. 2B relative to FIG. 2A for the sake of clarity—for example, information 220A is shown to illustrate the starting direction from which the video data is captured at viewing location 210A, but details such as information 222A about the number of frames and degrees of coverage captured for the resulting panorama image are not illustrated.

In addition, information 203 of FIG. 2B illustrates additional details about the user travel paths 235a and 235b, such as to indicate that the user departs from the viewing location 210A at a point 237 in a direction that is just west of due north (as illustrated with respect to directional indicator 209), proceeding in a primarily northward manner for approximately a first half of the travel path 235a, and then beginning to curve in a more easterly direction until arriving at an incoming point 238 to viewing location 210B in a direction that is mostly eastward and a little northward. In order to determine the departure direction from point 237 more specifically, including relative to the video acquisition starting direction 220A for viewing location 210A, initial video information captured as the user travels along travel path 235a may be compared to the frames of the panorama image for viewing location 210A in order to identify matching frames/images (in a manner similar to that discussed with respect to FIG. 2A and elsewhere for comparing frames/images from different viewing locations)—in particular, by matching one or more best frames in that panorama image that correspond to the information in the initial one or more video frames/images taken as the user departs from point 237, the departure direction from point 237 may be matched to the viewing direction for acquiring those matching panorama images. While not illustrated, the resulting determination may correspond to a particular degree of rotation from the starting direction 220A to the one or more matching frames/images of the panorama image for that departure direction. In a similar manner, in order to determine the arrival direction at point 238 more specifically, including relative to the video acquisition starting direction 220B for viewing location 210B, final video information captured as the user travels along travel path 235a may be compared to the frames of the panorama image for viewing location 210B in order to identify matching frames/images, and in particular to frames/images in direction 239 (opposite to the side of viewing location 210B at which the user arrives).

While such departure direction and arrival direction would match the actual relative direction 232 between the viewing locations 210A and 210B (with direction 232 being a two-way direction in a manner similar to that of direction 226 of FIG. 2A, including the direction of inter-panorama link 225A-B from viewing location 210A to 210B and the direction of inter-panorama link 225B-A from viewing location 210B to 210A) if the travel path 235a was completely straight, that is not the case here. Instead, in order to determine the direction 232, acceleration data captured as part of the linking information for the travel path 235a is analyzed to identify user velocity and location along the travel path 235a, in order to model the resulting relative locations of the travel path between starting point 237 and arrival point 238. Information 206 and 207 illustrates examples of such analysis of corresponding acceleration data captured along the travel path 235a, with information 206 corresponding to acceleration and velocity in a north-south direction, and information 207 corresponding to acceleration and velocity in an east-west direction—while not illustrated here, in some embodiments further information will be determined for acceleration and velocity in a vertical direction, such as to manage situations in which a user ascends or descends stairs or otherwise changes a vertical height (e.g., along a ramp) as he or she moves along the travel path. In this example, referring to information 206 corresponding to the north-south direction, the acceleration data acquired (e.g., from one or more IMU units in a mobile device carried by the user) illustrates that there is an initial significant acceleration spike in the northerly direction as the user began moving, which then drops to near zero as the user maintains a constant velocity in a generally northern direction along the middle portion of the travel path 235a, and then begins a longer but less sharp acceleration in the southerly direction as the user curves to a primarily easterly direction toward viewing location 210B and decelerates at arrival. As discussed in greater detail elsewhere herein, the acceleration data is integrated to determine corresponding north-south velocity information, as further illustrated in information 206, and is then further integrated to determine location information for each data point (not shown in information 206 in this example, but corresponding to the illustrated travel path 235a). By combining the determined velocity and location information, an amount of north-south movement by the user along travel path 235a may be determined, corresponding to an aggregate amount of north-south distance traveled between viewing locations 210A and 210B. In a similar manner, information 207 illustrates acceleration and velocity information in an east-west direction for the travel path 235a as the user moves along the travel path, with the resulting double integration in velocity and location data providing an aggregate amount of east-west distance that the user travels along the travel path 235a. By combining the aggregate north-south and east-west distances (and assuming in this example that no height change occurred) with the determined departure and arrival information, a total distance traveled between viewing locations 210A and 210B in a corresponding direction 232 is determined.

While a similar user travel path 235b is illustrated from viewing location 210B to 210C, with similar acceleration data captured as part of its linking information, corresponding acceleration and velocity information is not illustrated for the travel path 235b in a manner analogous to that of information 206 and 207. However, based on a similar analysis of departing direction from viewing location 210B, arrival direction at viewing location 210C, and intervening velocity and location for some or all data points for which acceleration data is captured along the travel path 235b, the user's movement for travel path 235b may be modeled, and resulting direction 231 and corresponding distance between viewing locations 210B and 210C may be determined. As a result, inter-panorama link 225B-C may be generated for the panorama image generated at viewing location 210B in a direction 231 to viewing location 210C, and similarly, inter-panorama link 225C-B may be determined for the panorama generated at viewing location 210C in direction 231 to viewing location 210B.

Despite the lack of linking information captured between viewing locations 210A and 210C (e.g., because the user did not travel along a path between those viewing locations, because linking information was not captured as a user did travel along such a path, etc.), information 203 further illustrates an example of direction 226 that may optionally be determined between viewing locations 210A and 210C based on the analysis of linking information for travel paths 235a and 235b (and with corresponding inter-panorama links 225A-C and 225C-A in direction 226). In particular, even if an absolute location of viewing locations 210A, 210B and 210C are not known from the analysis of the linking information for travel paths 235a and 235b, relative locations of those viewing locations may be determined in a manner discussed above, including distances and directions between viewing locations 210A and 210B and between viewing locations 210B and 210C. In this manner, the third side of the resulting triangle having determined lines 232 and 231 may be determined to be line 226 using geometrical analysis, despite the lack of direct linking information between viewing locations 210A and 210C. It will be further noted that the analysis performed with respect to travel paths 235a and 235b, as well as the estimation of direction and distance corresponding to 226, may be performed regardless of whether or not viewing locations 210A, 210B and/or 210C are visible to each other—in particular, even if the three viewing locations are in different rooms and/or are obscured from each other by walls (or by other structures or impediments), the analysis of the linking information may be used to determine the relative locations discussed above (including directions and distances) for the various viewing locations. It will be appreciated that the techniques illustrated with respect to FIGS. 2A and 2B may be continued to be performed for all viewing locations in building 198, resulting in a set of linked panorama images corresponding to viewing locations 210A-H, or otherwise in other similar buildings or other structures.

Figure 2E:
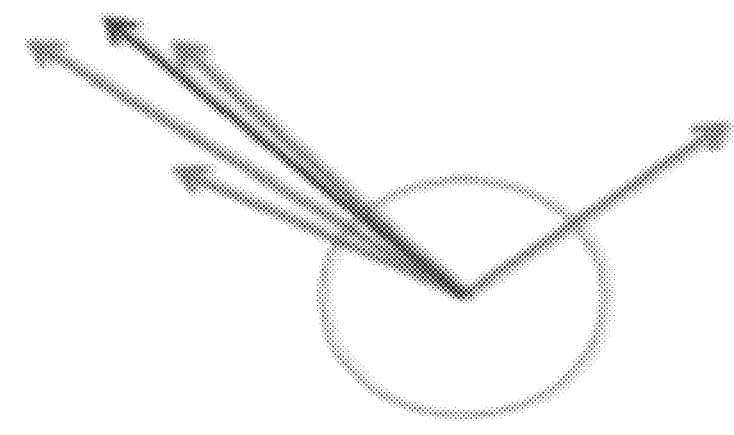

The following discussion, including with respect to corresponding FIGS. 2C-2E, provides example details regarding particular embodiments for determining inter-panorama connection information—however, it will be appreciated that the details presented are for illustrative purposes, and other embodiments may be performed in other manners.

As discussed in greater detail with respect to FIG. 2A and elsewhere, connections between at least some panorama images may be determined in part or in whole based on matching frames/images corresponding to those panorama images. Such techniques may be of particular use if the scene is rich in visual texture/features, and the two panoramas' viewing locations have direct line-of-sight to each other.

Consider, as an example, two panorama images 0 and 1, with panorama image 0 including a sequence of frames I-00, I-01, I-02, I-03, . . . I-0m and having respective angles a-00, a-01, a-02, a-03, . . . a-0m with respect to that panorama image's starting video acquisition direction, and with panorama image 1 including a sequence of frames I-10, I-11, I-12, I-13, . . . I-1n and having respective angles a-10, a-11, a-12, a-13, . . . a-1n with respect to that panorama image's starting video acquisition direction. The results of analyzing the matching frames/images between the panorama images includes determining whether the two panorama images are visually connected, and if so, what is the orientation angle A-01 in panorama image 0 toward panorama image 1, and what is the orientation angle A-10 in panorama image 1 toward panorama image 0.

As one technique for calculating such orientation angles A-01 and A-10, every frame from panorama image 0 is compared with every frame from panorama image 1, to see if they are visually connected. So if there are m frames in panorama image 0, and n frames in panorama image 1, m×n comparisons will be performed. For each comparison of such an image pair, a check is performed of whether the two images have sufficient visual feature matches to determine relative position information. To do so, visual feature locations of each of the two images are first detected, such as by using one or more of existing SIFT, MSER, FAST, KAZE, etc. feature detectors. Feature descriptor vectors are then calculated around the detected feature location neighborhood to describe the feature, such as by using one or more of existing SIFT, BRIEF, ORB, AKAZE etc. feature descriptors. A check is then made between the two images in the image pair for whether a feature descriptor from one image has a similar feature descriptor in the other image, and if so that feature pair forms a putative feature pair—in so doing, a feature descriptor is similar to another feature descriptor, when the descriptors have a short distance in the vector space (e.g., below a defined distance threshold, such as using L2 distance, L1 distance, Hamming distance for binary descriptors, etc.), and a frame pair has enough putative feature matches if they satisfy or exceed a defined feature match threshold.

Comparison of an image pair may in some embodiments include computing a homography matrix (referred to as "H" in this example) and/or an essential matrix (referred to as "E" in this example). If two images I-$0i$ and I-$1j$ of a putative matching image pair are looking at a planar surface (2D surface in the 3D world, such as a wall with some pictures on it), and if 4 pairs of putative feature matches exist given the matching locations on the images, a Nomography matrix H can be recovered such that for any pair of features (p$0x$, p$0y$) in I-$0i$ and (p$1x$, p$1y$) in I-$1j$, H can be applied to (p$0x$, p$0y$) to directly compute the location of the corresponding feature (p$1x$, p$1y$) in I-$1j$. If more than 4 pairs of putative feature matches exist that are all true matching features, a least square solution of H can be computed—in addition, if some of the putative matches are outliers, Random Sampling Consensus algorithm ("RANSAC") can be performed to achieve a robust estimation of H. If the two images I-$0i$ and I-$1j$ of a putative matching image pair are looking at a scene with 3D objects rather than a 2D surface (e.g., a room corner where two walls and a floor meet), and if 5 pairs of putative feature matches exist given the matching locations on the images, an Essential matrix E can be recovered such that for any pair of features (p$0x$, p$0y$) in I-$0i$ and (p$1x$, p$1y$) in I-$1j$, (p$0x$, p$0y$) from I-$0i$ can be mapped with E to the neighborhood of (p$1x$, p$1y$) in I-$1j$. The neighborhood is defined as closeness to the epipolar lines of (p$1x$, p$1y$) in I-$1j$, with those epipolar lines defined as lines connecting (p$1x$, p$1y$) and the epipole in I-$1j$, where the epipole is the projection of I-$0i$'s camera center (the optical center 3D location of the camera which took the picture of I-$0i$) onto the image of I-$1j$. If more than 5 pairs of putative feature matches exist are all true matching features, a least square solution of E can be computed—n addition, if some of the putative matches are outliers, RANSAC can be performed to achieve a robust estimation of E. Once the H or E matrix is computed, the quantity of feature pairs that are actually inliers can be counted, and if smaller than a defined threshold (e.g., 15), the image pair is discarded for further evaluation as being unlikely to be a valid pair looking at the same region of a scene. Given Essential matrix E or Nomography matrix H and the camera parameters (intrinsics) which took the pictures I-$0i$, and I-$1j$, E or H can be decomposed into a relative rotation 3-by-3 matrix R and relative translation 3-by-1 vector T between the two camera locations (there may be up to four mathematical solution sets of the decomposition, at least two of which may further be invalidated if point correspondences are available by applying positive depth constraint, if all points are in front of both cameras). Additional details for computing H from corresponding feature locations, for computing E from corresponding feature locations, for performing least square solutions, for performing RANSAC, and for decomposing matrix E into matrix R and vector T are included in Multiple View Geometry in Computer Vision, $2^{nd}$ Edition, Richard Hartley and Andrew Zisserman, Cambridge University Press, 2004, which is hereby incorporated herein by reference in its entirety. Additional details for decomposing matrix H into matrix R and vector T are included in Deeper Understanding Of The Nomography Decomposition For Vision-Based Control, Ezio Malis and Manuel Vargas, Research Report RR-6303, INRIA, 2007, pp. 90, which is hereby incorporated herein by reference in its entirety.

Since information about whether an image pair is looking at a 2D planar surface (e.g. a wall) or a full 3D scene (e.g. a room corner) is not typically available in advance of analysis of the image pair, both H and E matrices of any given image pair are computed in some embodiments. The remaining solution sets can be further evaluated in two aspects: (1) reprojection error, in which given a pair of rotation and translation and feature correspondence locations on the two images, the 3D feature locations can be computed using a method called triangulation; and (2) rotational axis check, in which the relative rotation between any two given image pairs should be around a vertical rotational axis if users are holding the cameras vertically, and any solution set that does not have a rotation whose rotational axis is close to a vertical direction can be filtered out. The basic idea of reprojection error is to project the viewing rays of the feature back into the 3D space, with the 3D location being where the two viewing rays of the same feature from the two cameras meet or intersect, and with further details regarding performing robust triangulation available in Multiple View Geometry in Computer Vision, $2^{nd}$ Edition, as indicated above. The 3D points can then be reprojected onto the images again, to check how close the reprojections are to the original feature locations found in the feature detection step, and with the matrix R and vector T solution set with the best performance selected as the mostly likely true solution to the image pair. Solution sets passing the aforementioned two evaluation criterions are considered valid solutions, and an image pair with at least one valid solution set is considered a valid image pair for further angle computation.

FIG. 2C illustrates a further example of image/frame matching for two panorama images (also referred to as "panos") 0 and 1. For example, information 271 shows that, given a valid image pair with matrix R and vector T and the resulting triangulated 3D points, the location of the two panorama centers and the scene location can be determined, using the mean location of the triangulated 3D points. The top-down relative angle between the two frames, denoted as α, is computed, as well as the two angles β and γ. The per-frame top-down angle of I-$0i$ is also known from the panorama starting (reference) orientation, denoted as cp, and with I-$1j$'s angle denoted as θ. Thus, the orientation from panorama image 0 transitioning to panorama image 1 relative to panorama image 0's reference orientation, denoted as δ=φ+β, can be computed, as well as the orientation from panorama image 1 transitioning to panorama image 0 relative to panorama image 1's reference orientation, denoted as ω=θ−γ. Such a δ and ω can be computed from every valid image pair, with all valid image pairs checked and used to create a histogram (approximated distribution) of gathered δs and ωs, as shown in information 272. Finally, the consensus δ angle and ω angle from the distribution are chosen as the transitioning direction from panorama image 0 to panorama image 1, and from panorama image 1 to panorama image 0 respectively. In example information 272, the horizontal axis is the candidate orientation from pano 0 to pano 1, ranging from 0 to 360, and the vertical axis shows the frame-pairs counts that generate the corresponding orientation angle—in this case, there are two major angles that potentially are the orientation from pano 0 to pano 1 (i.e. around 0 degrees, and 75 degrees). This means the two hypotheses are competing against each other, such as because the scene has some repetitive features at different locations, and/or both orientations are valid numerically in terms of homography/essential matrix decomposition. The peak around 75 is selected as the final orientation for this example as the more likely solution.

As one example of an energy optimization process for a global estimation of inter-panorama connection information (as discussed in greater detail below), example costs attempt to minimize changes to individually calculated information values, while enforcing overall consistency (e.g., a first inter-panorama connection angle between two panorama images that is calculated from image/feature matching should be the same as a second inter-panorama connection angle between those same two panorama images that is calculated from using linking information, and vice versa; a calculated location of a destination viewing location for a panorama image from captured linking information should be the same as the actual location, using a loose norm to account for linking information possibly not starting and/or ending exactly at the respective viewing locations; calculated travel path positions and turn angles from linking information should be the same as actual, to minimize sharp turns and abrupt location changes; etc.).

In addition, confidence values can further be determined for such calculated inter-panorama connection angles from image/frame matching. As one example, various factors may affect a visual connection between two panorama images, and the resulting confidence value(s), such as the following: (1) number of frames in each panorama image sequence, reflecting an indirect indicator of speed of rotation, image blurriness, and IMU signal smoothing; (2) angle between frame-pair viewing directions, with both the intersection depth certainty and the potential perspective distortion between corresponding features seen from the two views increasing with the size of the angle; (3) per-frame matching inlier feature numbers, modeling the texture richness of the viewing angles; (4) peak choice confusion, corresponding to the number of peaks in sample orientation consensus distribution (as the number of peaks increase, the likelihood increases of choosing a wrong peak as a solution); and (5) sample circular coverage, corresponding to the coverage of samples around the 360 degree of a panorama circle that supports the final angle. In one example confidence value calculation technique, factors 4 and 5 are the primary factors considered. For factor 4, the probability of the chosen peak being correct is computed by marginalizing over likelihood of all peaks, with the prior of all peaks assumed to be the same—the rationale is that when multiple peaks are available in the distribution, the choice of the highest peak is more probable to be a wrong choice than when there is only a single peak. For factor 5, the probability of consensus angles being correct increases as the coverage of samples around the 360 degree of a panorama circle increases—the rationale is that if the chosen connection angle gets support from multiple panorama angles from the scene rather than a single direction (favoring a well-textured scene over a poorly-textured one, as well as a same-room panorama connection than a connection between two rooms that only connected through a narrow door, and thus corresponding in part to factor 3 as well), it is more likely to be the true direction of connection.

With respect to calculating an example confidence value, a Peak Choice Confusion determination is first performed. Using the information 272 of FIG. 2C as an example, all the dominant modes (in this case two modes) are first found, and all samples' probability of being part of each mode are marginalized, as follows:

$$P(\text{mode}) = \Sigma P(\text{mode}|\text{sample}) * P(\text{sample}).$$

In the above equation, P(mode|sample) is represented as a rotational Gaussian distribution (rotational distance to the central value), because angles are periodical—for example, 359 degree's distance to 10 degree is 11 degrees. A heuristic standard deviation d is assigned to the Gaussian model (10 degrees). In other words:

$$P(\text{mode}|\text{sample}) = 1/N * \exp(-\text{rotational\_angle\_diff}^{\wedge}2/(2*d)),$$

where N is a normalization term.

Once all P(mode) are computed, they are normalized by their sum, so that they added up to 1. Given the above definition, the more dominant a mode is, the more confidence results that the angle of that mode corresponds to the correct pano-to-pano orientation or direction.

In addition to determining Peak Choice Confusion information, Sample Circular Coverage information is also determined and used. Consider an example of a top-down view of a room and two panoramas in it, as shown in the left and right plots of information 273 of FIG. 2D. Each dotted line pair from the two panoramas represents a sample pair of frames found in that specific direction, due to richness of textures in a corresponding location in the room (represented by dots on the room wall). It is easy to see that the plot on the right has sample pairs from more directions than that of the left plot (red sectors around the panorama centers), and the more sampled angles across the whole 360 degree range suggests the more reliable the determined aggregate pano-to-pano orientation will be (from a distribution/consensus of orientations). The Sample Circular Coverage analysis includes dividing a full 360 degree span into 36 sectors, and then checking the coverage of those sectors for each panorama image. Similar to the mode computation noted above, the impact of all samples to each sector is computed as:

$$P(\text{sector}) = \Sigma P(\text{sector}|\text{sample}) * P(\text{sample}).$$

P(sector) is then thresholded (0.1) to generate a binary decision if the sector is contributing to the final orientation. The number of sectors that have positive contribution are counted and divided by the number of sectors (here 36). By so doing, the orientation computed between two panoramas that are only connected in a single location in the room (e.g., by a painting on a textureless wall) is less robust than the orientation computed between two panoramas that are inside a well-textured house with a larger number of room locations used for matching.

A final confidence value is then determined for calculated inter-panorama connection angles from image/frame matching by using a multiplication of the two above factors (corresponding to Peak Choice Confusion and Sample Circular Coverage), which model different aspects related to confidence and are generally independent from the other. A pair of panorama images has two determined inter-connection angles: an outgoing angle from each pano to the other. Therefore, there is a confidence score for each angle. However, the two angle confidences are the same, since angles are computed by panorama to panorama mutual matching. Accordingly, the determined direction 226 in information 201 of FIG. 2A is shown as a "double-ended" arrow.

The determination of confidence values for calculated inter-panorama connection angles can further be determined differently when using captured linking information for such calculations, rather than for calculated angles from image/frame matching as discussed above. As noted above, and with further details below, the calculating of inter-panorama connection angles from captured linking information depends on multiple factors, including the following: (1) frame visual matching from the first panorama to the starting frames of the linking video, and the ending frames of the linking video to the second panorama, with the accuracy of relative angles between the panoramas to the linking videos depending on the visual matching quality; (2) travel path length, in which IMU noise impacting the double integration increases with the length; and (3) straightness of the travel path, in which IMU noise impacting the double integration increases with the number of turns or other deviations from a straight travel path.

With respect to calculating an example confidence value based on the use of captured linking information, a Visual Matching Weight determination is first performed, with information 274 of FIG. 2E as an example. All frames in a panorama sequence are matched to a few frames at the beginning/end of a linking video, such as based on using one or both of the following to compute such visual matching: (1) feature-based visual matching, with Nomography used as a geometric verification model; and (2) a DeepFlow-based matching (e.g., if technique (1) does not produce reliable matching result for any pair of pano-frame and linking-video frame, such as due to lack of texture in the linking video frames from pointing to a white wall or for other reasons). The two techniques' reliability (prior) is set to 1.0 and 0.6 respectively (and referred to below as Matching Method Weight), because the feature-based method is typically more robust than the DeepFlow-based one if the feature-based method succeeds. For feature-based visual matching, the consistency of angle directions from different frame pairs is further taken into account, weighted by the number of matches in each pair, as shown in information 274 of FIG. 2E, with four samples of angles between a frame in a panorama and a frame in a linking video shown, using vector magnitude to indicate the number of matches in a direction, and with the darker arrow as the final chosen direction. The weighted direction and its corresponding number of matches (magnitude of the darker vector) is mapped to a value within [0, 1], and referred to as the *Visual Matching Weight* below, with the mapping being linear and clamped between [10, 500].

In addition to determining Visual Matching Weight information, information on Travel Path Length and Number Of Turns for the travel path is also determined and used. The *Travel Path Length Weight* is modeled as 1-num_frames*E1, where E1 is a predefined error loss when accumulating a new frame, currently set to 0.001, and with a minimum weight clamped at 0.01. The *Number of Turns Weight* is modeled as 1-num_turns*E2, where E2 is a predefined error loss when accumulating a new turn, currently set to 0.02, and with a minimum weight also clamped at 0.01. To compute the number of turns, the curvature of the IMU in the two horizontal directions (referred to as "x" and "z" for the purpose of this example, with "y" treated as the floor normal in this example IMU coordinate system) for each linking video frame, skipping initial front and last end (e.g., initial 12 frames and last 12 frames) because those frames are normally stationary and any curvature should correspond to noise. The quantity of peaks above a certain curvature threshold (e.g., 8) during the whole video are then counted, and used as the number of turns.

A final confidence value is then determined for calculated inter-panorama connection angles from captured linking information by using a multiplication of the above factors (resulting in *Matching Method Weight*Visual Matching Weight*Travel Path Length Weight*Number of Turns Weight*). For this type of calculated inter-panorama connection angles, the confidences for the two angles of a determined connection between two panorama images are typically different, because the two outgoing angles are computed asymmetrically (independent of each other), with the first angle computed from the first panorama to linking video matching, and the second angle computed from linking video to the second panorama matching.

To make the comparison meaningful between confidence values determined for calculated inter-panorama connection angles from feature/image matching and from using captured linking information (e.g., so that a global connection computation can use both types of connection information, as discussed further below), a scaling between the two types of confidence scores is recovered and used. As one example, this can be performed empirically by creating a database of pano-connection calculations as compared to actual results, allowing a relative confidence scale between the two types of confidence values to be determined (which can be thought of as the posterior probability: P(Angle|feature/image matching)*P(feature/image matching) and P(Angle|captured linking information)•P(captured linking information).

In some embodiments, as part of determining whether feature/image matching will be used to determine a possible inter-connection between two panorama images, an initial optional visibility estimation check is performed, to allow panorama pairs that do not share any (or sufficient) visual content to be filtered before more detailed feature/image matching is performed. This involves attempting to find, from some corresponding points between the panoramas, if a geometric model can fit them, using a random generation of putative models from a subset of the corresponding points. Doing so involves a two-step procedure, with an initial step of feature point registration, using a feature-based matching in order to detect some putative corresponding point between the two panoramas. A second step of robust model estimation is then performed, where an attempt is made to fit a coherent geometric model for that point. To do so, an attempt is made to robustly estimate a single axis (vertical axis) rotation matrix, using a minimal solver that uses 1-point correspondence (which makes sampling and solving fast), using ACRansac (which minimizes the angular distance between the estimated model and provided corresponding vectors). If this single vertical axis rotation matrix fails, an attempt is made to estimate a homography matrix. If neither model can be estimated, this pair of panorama images is filtered from use in the feature/image matching.

When using captured linking information for a travel path between two viewing locations to determine an inter-connection between the panorama images for those viewing locations, acceleration data for the user's movement along the travel path may be acquired and used, as previously noted. For example, smart phones are typically equipped with various motion sensors, often referred to in the aggregate as an inertia measurement unit (IMU)—such sensors may include an accelerometer (used as a low-frequency pose estimator), a gyroscope (high-frequency pose estimator), and/or a magnetometer (e.g., a compass), and are known to work well for estimating the device's rotation.

However, using such IMU data to estimate the device's position has been difficult or impossible, particularly without the use of specialized sensors that are not typically part of smart phones. The task sounds straightforward in theory—given an estimation of the device's rotation, the direction of gravity at every frame is known, and an integration can be performed to obtain velocity (after subtracting gravity, a constant acceleration on the earth, from the acceleration measures), and a second integration performed to get the position. However, double-integration operations are highly sensitive to noise and bias in the raw sensor measurements, and a simplistic version of this operation may provide highly incorrect and useless position estimates. Imagine you are going up in an elevator from the 1st floor to the 30th floor in a high-rise building. You feel some vertical acceleration initially, then almost nothing along the way, then some deceleration at the end—without a visual indication within the elevator of the floor, it can be impossible to accurately estimate the vertical distance traveled, particularly when the speed of an elevator may be different every time and there may be significant perpendicular vibrations every second (mimicking human steps).

In at least some embodiments, noise/bias is handled by first modeling the bias. In particular, nonlinear least squares optimization may be used to estimate sensor bias and produce accurate per-frame device rotation. In this example, the sensor bias is modeled in the global coordinate frame, although other embodiments may instead model bias in the local (sensor) coordinate frame. Let $\{a_0, a_1, \ldots\}$ denote the acceleration measures minus the gravity in the global coordinate frame at the input frames, with each symbol representing a 3D vector. Let us first consider what kind of accelerations are expected for a simple straight walking motion along a single lateral axis.

To correct bias, it is first estimated as follows:

$$\{\bar{a}_0, \bar{a}_1, \ldots\}, \bar{a}_f = a_f + \delta(f),$$

where $\bar{a}_f$ of denotes the refined acceleration at frame f, and $\delta(f)$ is the estimated bias for frame f. This estimated bias is represented as a piecewise linear model. To do so, several control points are used along the input frames, with each control point having 3 variables to be estimated. The bias acceleration is obtained by a simple linear combination of the surrounding control points at every frame. The frequency of control points to be placed can be varied as appropriate—for example, if 20 control points are placed, the nonlinear least squares optimization problem to be solved will have 60 (=20×3) parameters subject to the constraints.

The selection of which constraints to enforce has a significant effect on the usefulness of double integration. In this example, the sum of squares of these constraint equations (some use a robust norm) is minimized subject to the bias terms, which are initialized to be 0, and with the ceres solver used to solve the problem in this example. Note that, $\{50, 100, \ldots\}$ are just examples, and this interval can be specified as an input parameter.

accelerations must be 0 at the first few seconds and at the last few seconds (based on asking a user to stop and stand still at the beginning and the end of the acquisition), corresponding to for each $f' \in \{param1, param2, \ldots\}$, $\bar{a}_{f'}=0$, where param1 and param2 are specified according to the length of the non-movement interval;

velocities (sum of accelerations from the start) must be 0 at the first few seconds and at the last few seconds (based on asking a user to stop and stand still at the beginning and the end of the acquisition), corresponding to for each f'

$$\in \{param1, param2, \ldots\}, \overline{v_{f'}} = 0, \text{ where } \overline{v_{f'}} = \sum_{f=1}^{f'} \overline{a_{f'}};$$

velocity direction must be the same as the device's z axis (using the z axis as the lateral forward direction), corresponding to for each $f' \in \{param1, param2, \ldots\}$, $\|\bar{v}_{f'}\|(1.0-\bar{v}_{f'}^- *\{Device-Z\})=0$, where Device-Z is obtained from the camera rotation, and if the velocity estimation at a frame coincides with the direction of the device—while this assumption is often true as a person normally walks straight, it may not be true sometimes (e.g., when moving side-ways to avoid obstacles), and therefore the robust error metric (HuberLoss) is used;

maximum velocity must not be more than a certain speed (e.g., with velocity more than 1.5 m/sec being penalized), corresponding to for each $f' \in \{param1, param2, \ldots\}$, $\max(\|\bar{v}_{f'}\|-1.5, 0)=0$;

the norm of the velocities must be the same during the video (except for some margin at the beginning and at the end), so as to penalize the differences of velocities at different sampled frames (e.g., if F frames are sampled, there would be (F choose 2) number of constraints), corresponding to for each f' $\delta$ $\{param1, param2, \ldots\}$, for each $g' \in \{param1, param2, \ldots\}$, $\|\bar{v}_{f'}\|=\|\bar{v}_{g'}\|$; and the magnitude of the bias terms at control points should be small as much as possible (enforced as a weak regularization term, in which magnitudes are penalized), corresponding to $\|(C_i^x, C_i^y, C_i^z)\|=0$, where $(C_i^x, C_i^y, C_i^z)$ denotes the i_th acceleration bias variables.

As described above, initial inter-panorama connection information based on image/feature matching and/or by using captured linking information may be determined for some panorama images in a group representing a building interior or other structure, such as to use image/feature matching to inter-connect nearby panorama images that have sufficient overlap in their respective scenes, and/or to to captured linking information to inter-connect successive panorama images based on the user's travel path between their corresponding viewing locations. In at least some embodiments, an additional analysis is subsequently performed (e.g., as an energy optimization process), such as to verify the previously determined inter-connections on an overall global basis, and/or to determine additional inter-panorama connections based on the previously determined relative positions of previously unconnected panorama images.

Figure 3:
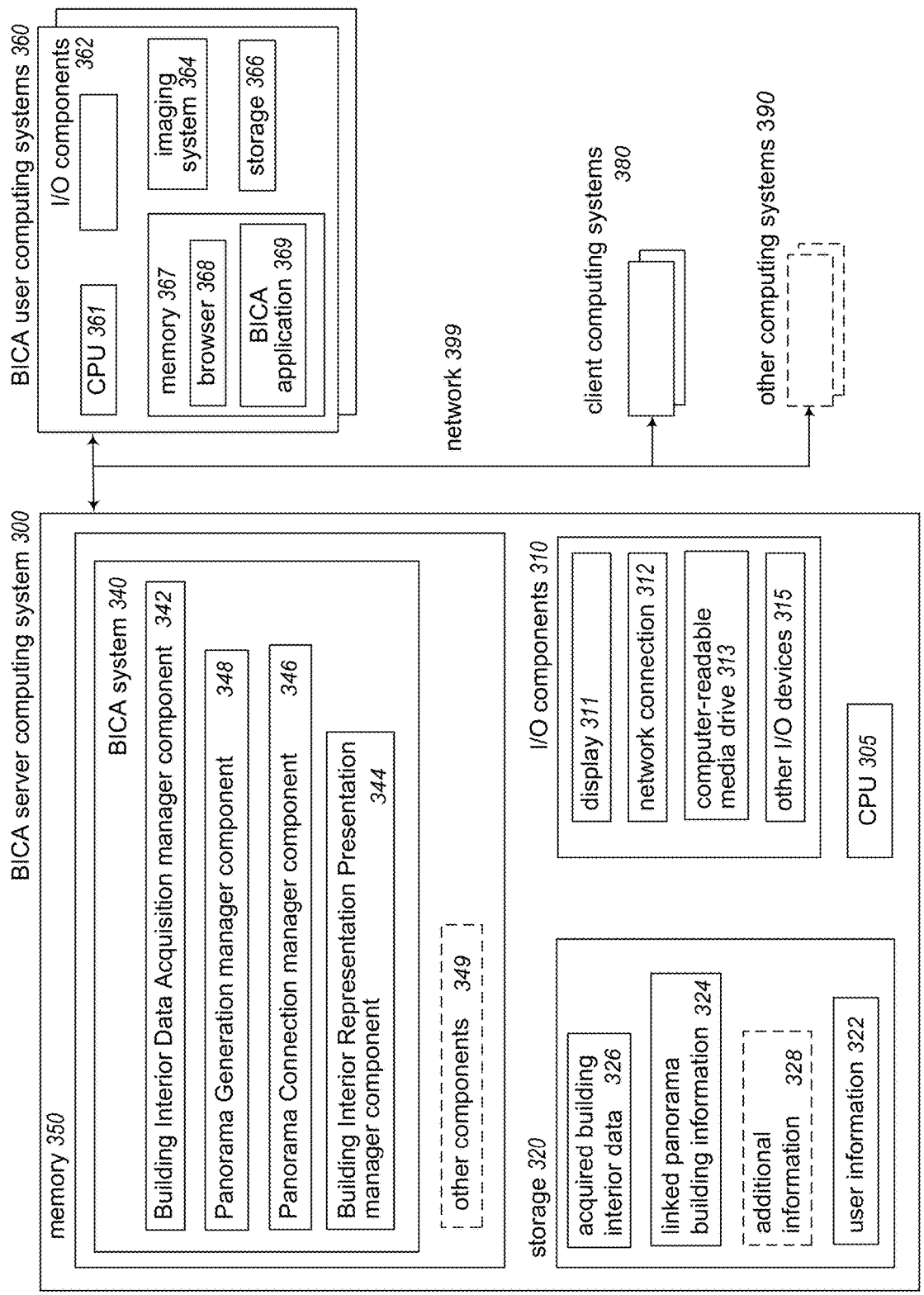
FIG. 3 is a block diagram illustrating a computing system suitable for executing an embodiment of a system that performs at least some of the techniques described in the present disclosure.

FIG. 3 is a block diagram illustrating an embodiment of a server computing system 300 executing an implementation of a BICA system 340—the server computing system and BICA system may be implemented using a plurality of hardware components that form electronic circuits suitable for and configured to, when in combined operation, perform at least some of the techniques described herein. In the illustrated embodiment, the server computing system 300 includes one or more hardware central processing units ("CPU") or other processors 305, various input/output ("I/O") components 310, storage 320, and memory 350, with the illustrated I/O components including a display 311, a network connection 312, a computer-readable media drive 313, and other I/O devices 315 (e.g., keyboards, mice or other pointing devices, microphones, speakers, GPS receivers, etc.). The server computing system 300 and executing BICA system 340 may communicate with other computing systems via one or more networks 399 (e.g., the Internet, one or more cellular telephone networks, etc.), such as BICA user computing systems 360 (e.g., used to capture building interior data), client computing systems 380 (e.g., on which generated building representations may be presented to end users), and other computing systems 390.

In the illustrated embodiment, an embodiment of the BICA system 340 executes in memory 350 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the BICA system includes Building Interior Data Acquisition manager component 342 (e.g., in a manner corresponding to Building Interior Data Acquisition manager 262 of FIG. 1B), Panorama Generation manager component 348 (e.g., in a manner corresponding to Panorama Generation manager 266 of FIG. 1B), Panorama Connection manager component 346 (e.g., in a manner corresponding to Panorama Connection manager 264 of FIG. 1B), Building Interior Representation Presentation manager 344 (e.g., in a manner corresponding to Building Interior Representation Presentation manager 268 of FIG. 1B), and optionally other components that are not shown, with the memory further optionally executing one or more other programs and components 349. As part of such automated operations, the BICA system 340 may store and/or retrieve various types of data, including in the example database data structures of storage 320, such as various types of user information in database ("DB") 322, acquired building interior data (e.g., viewing location visual data, linking information, etc.) in DB 326, generated building information (e.g., linked panoramas, etc.) in DB 324, and/or various types of optional additional information 328 (e.g., various analytical information related to presentation or other use of one or more building interiors previously captured, analyzed, and/or presented by the BICA system).

Some or all of the user computing systems 360 (e.g., mobile devices), client computing systems 380, and other computing systems 390 may similarly include some or all of the types of components illustrated for server computing system 300. As a non-limiting example, the user computing systems 360 include hardware CPU(s) 361, I/O components 362, storage 366, and memory 367. In the depicted embodiment, the user computing systems 360 also include an imaging system 364, and both a browser 368 and BICA client application 369 are executing within memory 367, such as to participate in communication with the BICA system 340 and/or other computing systems.

It will be appreciated that computing system 300 and other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated BICA system 340 may in some embodiments be distributed in various components other than those specifically illustrated, some of the illustrated functionality of the BICA system 340 may not be provided, and/or other additional functionality may be available. In addition, in certain implementations, various functionality of the BICA system may be provided by third-party partners of an operator of the BICA system—for example, generated building interior representations may be provided to other systems that present that information to end users or otherwise use that generated information, data collected by the BICA system may be provided to a third party for analysis and/or metric generation, etc.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the BICA system 340 and/or BICA client software executing on user computing systems 360 and/or client computing devices 380) and/or data structures, such as by execution of software instructions of the one or more software programs and/or by storage of such software instructions and/or data structures. Furthermore, in some embodiments, some or all of the systems and/or components may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/ cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
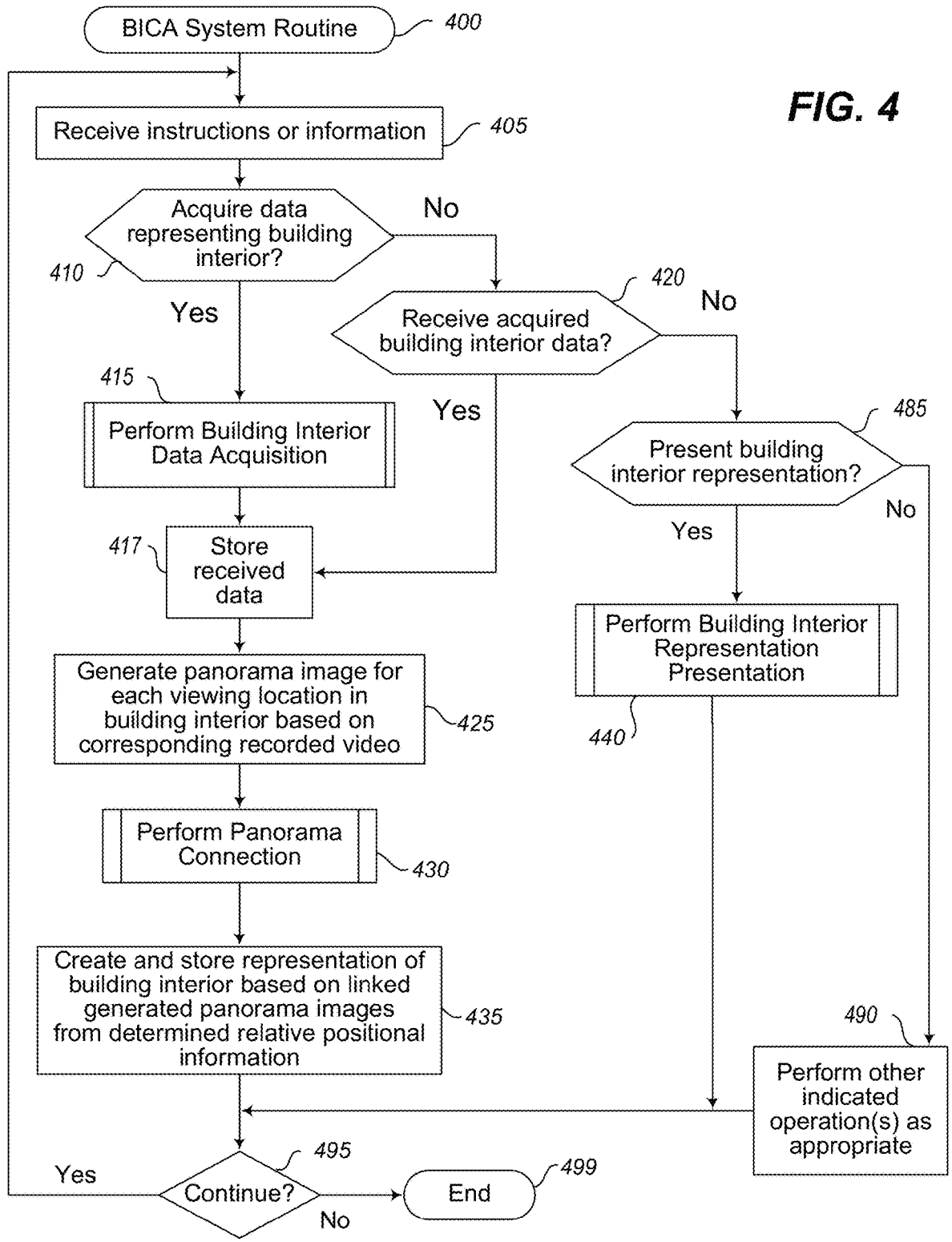
FIG. 4 depicts a process flow for a Building Interior Capture and Analysis (BICA) system routine in accordance with an embodiment of the present disclosure.
Figure 5:
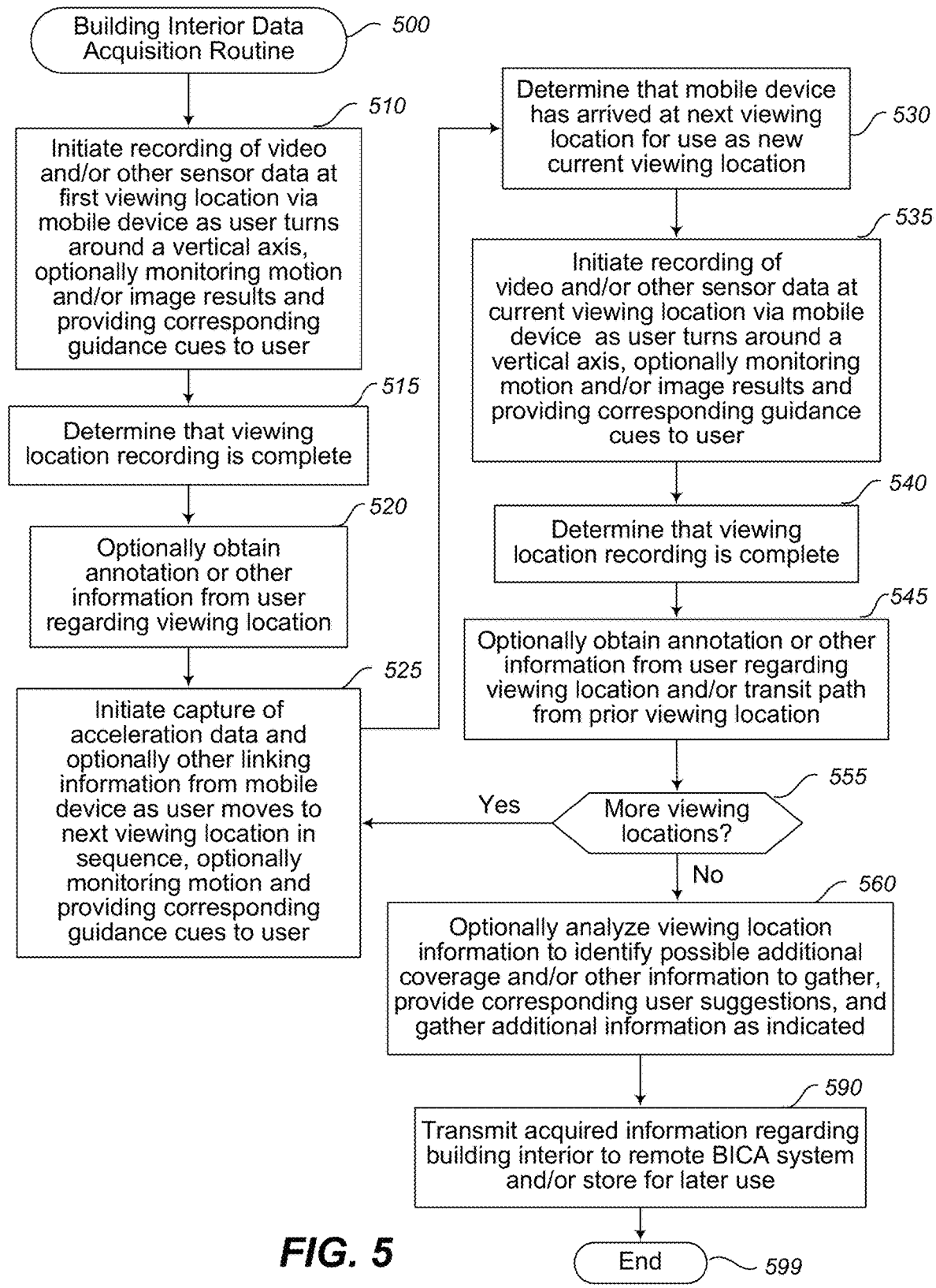
FIG. 5 depicts a process flow for a building interior data acquisition routine in accordance with an embodiment of the present disclosure.
Figure 6A:
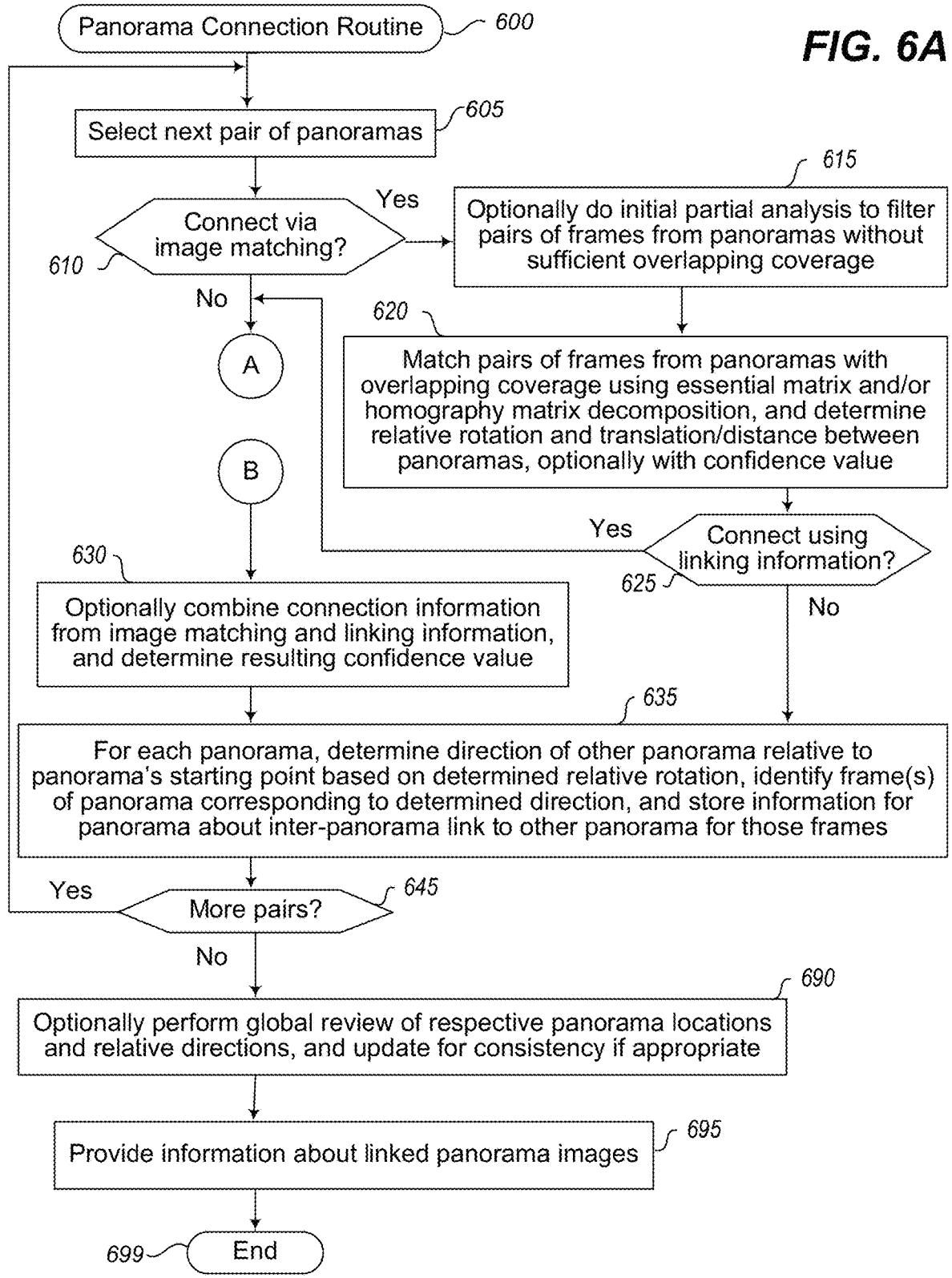
Figure 7:
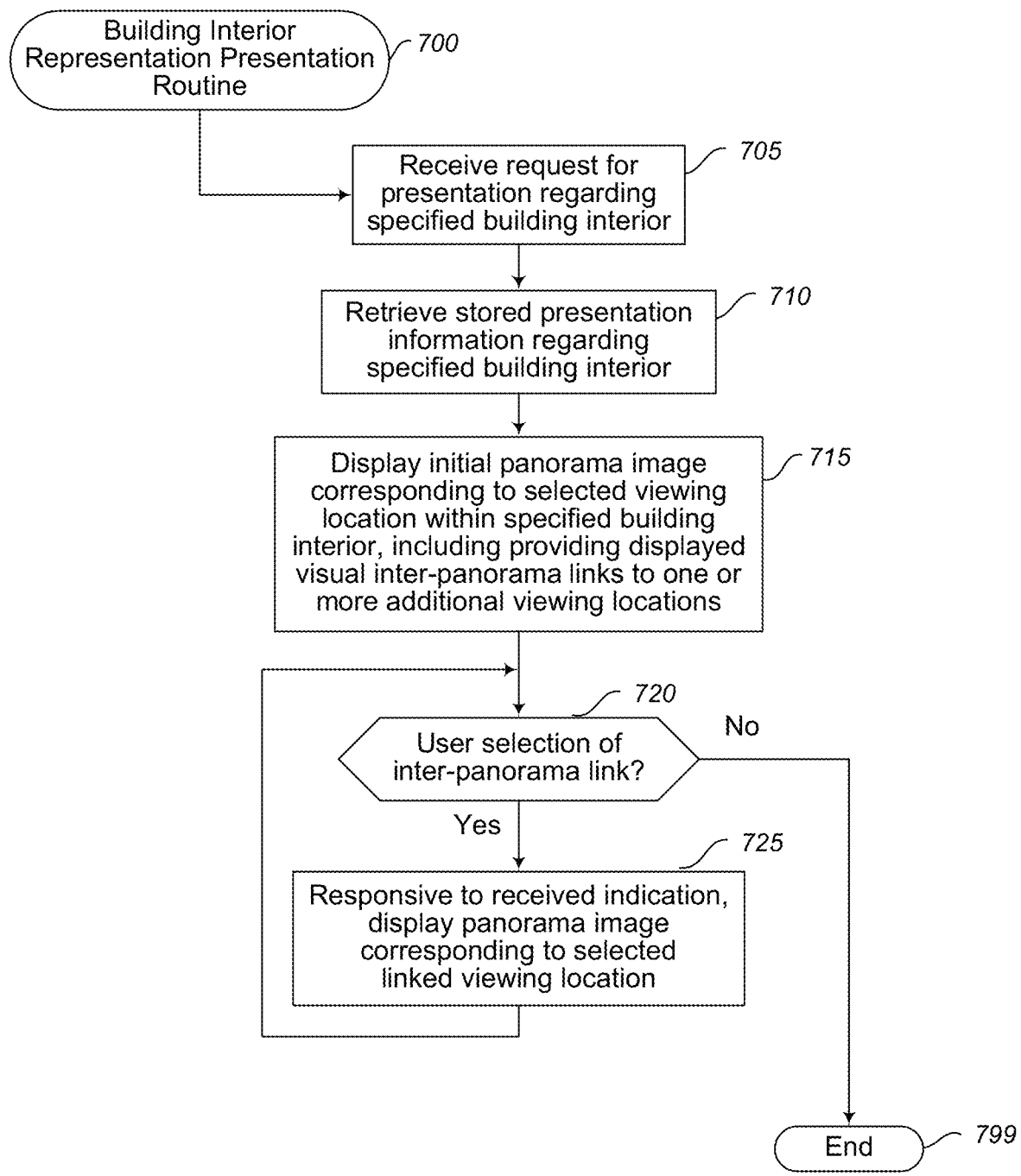
FIG. 7 depicts a process flow for a building interior representation presentation routine in accordance with an embodiment of the present disclosure.

FIGS. 4-7 depict exemplary automated operations for acquiring, analyzing and presenting information regarding a building, such as may be performed in some embodiments in part or in whole by a BICA system (e.g., by the BICA application 155 of FIG. 1A, by one or more components of the BICA system 260 of networked environment 180 depicted by FIG. 1B, and/or the BICA system 340 executed by the server computing system 300 of FIG. 3). In particular, FIG. 4 depicts an example overview process flow for a BICA routine; FIG. 5 depicts an example process flow for a building interior data acquisition routine; FIGS. 6A-B6 depict an example process flow for a panorama connection routine; and FIG. 7 depicts an example process flow for a building interior representation presentation routine.

FIG. 4 illustrates an example flow diagram for an embodiment of a Building Interior Capture and Analysis routine 400. The routine may be performed by, for example, execution of the BICA application 155 of FIG. 1A, the BICA system 260 of FIG. 1B, the BICA system 340 of FIG. 3, and/or the BICA system discussed with respect to FIGS. 2A-2E, such as to acquire, analyze and use information about a building interior, including to generate and present a representation of the building interior. While the illustrated embodiment acquires and uses information from the interior of a target building, it will be appreciated that other embodiments may perform similar techniques for other types of data, including for non-building structures and/or for information external to one or more target buildings of interest.

The illustrated embodiment of the routine begins at block 405, where instructions or information are received. At block 410, the routine determines whether the received instructions or information indicate to acquire data representing a building interior. If so, the routine proceeds to block 415 in order to perform a building interior data acquisition subroutine (with one example of such a routine illustrated in FIG. 5, as discussed further below) in order to acquire data representing the interior of a target building of interest. If it was determined at block 410 that the received instructions or information did not indicate to acquire data representing a building interior, the routine proceeds to block 420 to determine whether the received instructions or information included building interior data that has already been acquired, such as a transmission of previously captured building interior data from a remote mobile device (e.g., a mobile device executing a local instance of a BICA application), with the transmission of acquired building interior data from mobile device 185 to BICA system 260 via network(s) 170 of FIG. 1B illustrating one example of such data acquisition. Following block 415, or after a determination is made in block 420 that the received instructions or information include acquired building interior data, the routine proceeds to block 417 in order to store the acquired data.

After block 417, the routine proceeds to block 425, in which (whether via local processing, remote processing, or some combination thereof) a panorama image is generated for each viewing location of the captured building interior based on a corresponding recorded video or other acquired visual information for the viewing location. The routine then proceeds to block 430 in order to perform a panorama image connection subroutine (with one example of such a routine illustrated in FIGS. 6A-6B, as discussed further below) in order to determine inter-connections between the panorama images for the interior of the target building of interest, such as based on performing image/feature matching and/or using captured linking information.

It will be appreciated that, despite the categorical method of processing depicted in FIG. 4 in which all panorama images are generated based on analysis of recorded viewing location information prior to determining relative positional information for viewing locations, any order for such processing may be implemented in accordance with the techniques described herein. For example, the routine may instead process individual segments of captured information sequentially, such that a panorama image is generated for a first viewing location, followed by processing of linking information captured during movement away from that first viewing location to determine relative positional information for a second viewing location; a panorama image generated for the second viewing location, followed by processing of linking information captured during movement away from that second viewing location to determine relative positional information for a third viewing location; etc. In various embodiments, processing of captured information for one or many building interiors may be performed in a parallel and/or distributed manner, such as by utilizing one or more parallel processing computing clusters (e.g., directly by the BICA system or via one or more third-party cloud computing services).

After block 430, the routine continues to block 435, and creates and stores a representation of the captured building interior based on the panorama images generated in block 425 that are linked using the relative positional information for the multiple viewing locations determined in block 430. In particular, and as described elsewhere herein, each panorama image (corresponding to one viewing location within the building interior) is associated with information reflecting one or more user-selectable links to one or more other of the viewing locations, such that selection of a user-selectable link while viewing a panorama image associated with one viewing location initiates display of a distinct other panorama image associated with another viewing location.

If it is determined in block 420 that the instructions or information received in block 405 did not indicate to receive acquired building interior data, the routine proceeds to block 485, in which it determines whether the received instructions or information include an indication to present a previously stored representation of a building interior. If so, the routine proceeds to block 440 to perform a building interior representation presentation subroutine, to cause a display or other presentation of a created representation of a target building interior (such as via a client computing system of an end user, and with one example of such a routine illustrated in FIG. 7, as discussed further below).

If it was determined in block 485 that the instructions or information received in block 405 did not include an indication to present a previously stored representation of a building interior, control passes to block 490 to perform any other indicated operations as appropriate, such as any housekeeping tasks, to obtain and store information about users of the system, to configure parameters to be used in various operations of the system, etc.

Following blocks 435, 440, or 490, the routine proceeds to block 495 to determine whether to continue, such as until an explicit indication to terminate. If it is determined to continue, control returns to block 405 to await additional instructions or information, and if not proceeds to step 499 and ends.

FIG. 5 illustrates an example flow diagram for an embodiment of a Building Interior Data Acquisition routine 500. The routine may be performed by, for example, execution of the Building Interior Data Acquisition manager 262 of FIG. 1B, the Building Interior Data Acquisition manager component 342 of FIG. 3, the BICA application 155 of FIG. 1A, and/or the BICA system discussed with respect to FIGS. 2A-2E, such as to acquire information about a building interior, including visual information for each of multiple viewing locations and linking information from travel between at least some of the viewing locations. In addition, the routine may be initiated in various manners in various embodiments, such as from block 415 of FIG. 4, or instead in some embodiments by a user interacting directly with a mobile device to initiate video recording inside a building interior (e.g., by a local BICA application on the mobile device; if the video recording of the building interior is performed as one or more videos without the use of a local BICA application, and with corresponding IMU linking information later retrieved from the mobile device; etc.).

The illustrated embodiment of the routine begins at block 510, in which the routine initiates recording video and/or sensor data at a first viewing location within the building interior as a mobile device with imaging capabilities is rotated around a vertical axis located at the first viewing location. In addition, the routine may, in some embodiments, optionally monitor the motion of the mobile device during the recording at the first viewing location, and provide one or more guidance cues to the user regarding the motion of the mobile device, quality of the video being recorded, associated lighting/environmental conditions, etc. At block 515, the routine determines that video recording of the viewing location is completed. As discussed elsewhere herein, such determination may be based on an explicit indication from a user of the mobile device, or may be automatically determined based on one or more of an analysis of sensor data, the video being recorded, the user remaining substantially motionless for a defined period of time, etc. At block 520, the routine optionally obtains annotation and/or other information from the user regarding the captured viewing location. For example, in certain embodiments the BICA system may record audible or textual annotations from the user to further describe the viewing location (e.g., to provide a label or other description of the viewing location, to describe aspects of the viewing location that the recorded video or sensor data may not adequately capture, etc.), such as for later use in presentation of information about that viewing location.

After blocks 515 and 520, the routine proceeds to block 525 to initiate the capture of linking information (including acceleration data) during movement of the mobile device along a travel path away from the current viewing location and towards a next viewing location within the building interior. As described elsewhere herein, the captured linking information may include additional sensor data, as well as additional video information, recorded during such movement. Initiating the capture of such linking information may be performed in response to an explicit indication from a user of the mobile device or based on one or more automated analyses of information recorded from the mobile device. In addition, and in a manner similar to that noted with respect to capturing the first viewing location in block 510, the routine may further optionally monitor the motion of the mobile device in some embodiments during movement to the next viewing location, and provide one or more guidance cues to the user regarding the motion of the mobile device, quality of the sensor data and/or video information being captured, associated lighting/environmental conditions, advisability of capturing a next viewing location, and any other suitable aspects of capturing the linking information. Similarly, the routine may optionally obtain annotation and/or other information from the user regarding the travel path, such as for later use in presentation of information regarding that travel path or a resulting inter-panorama connection link.

At block 530, the routine determines that the mobile device has arrived at a next viewing location after the user travel path segment to which the linking information corresponds, for use as a new current viewing location. As described in greater detail elsewhere herein, such determination may be based on one or more of an explicit user request, an analysis of incoming sensor data, recorded video information, the user remaining substantially motionless for a defined period of time, etc. In response to the determination, the routine proceeds to block 535 to initiate capture of the current viewing location in a manner similar to that described for blocks 510-520 with respect to the first viewing location. In particular, the routine initiates recording of video and/or sensor data at the current viewing location within the building interior as the mobile device is rotated around a vertical axis located at the current viewing location, optionally monitoring the recording to provide one or more guidance cues to the user regarding the capture process. At block 540, in a manner similar to that noted with respect to block 515 for the first viewing location, the routine determines that recording of the current viewing location is completed, such as based on an explicit indication from a user, and/or one or more analyses of information from the mobile device. At block 545, the routine optionally obtains annotation and/or other information from the user regarding the captured viewing location and/or the travel path from the previous viewing location, such as audible or textual annotations from the user to further describe the viewing location or travel path, such as for later use in presentation of information regarding that viewing location and/or use of that travel path.

The routine proceeds to block 555 to determine whether all viewing locations within the building interior that have been selected by the user have been captured, such as based on an express request by a user of the mobile device to terminate the capturing process or, alternatively, a determination that the capturing process is to continue (such as via analysis of acceleration or other sensor data indicating that the mobile device is moving to a subsequent viewing location). If it is determined that the capturing process is to continue—i.e., that not all viewing locations for the building interior have yet been captured by the mobile device—the routine returns to block 525 in order to capture linking information during movement of the mobile device to the next viewing location in sequence within the building interior. Otherwise, the routine proceeds to block 560 to optionally analyze viewing location information, such as in order to identify possible additional coverage (and/or other information) to acquire within the building interior. For example, the BICA system may provide one or more notifications to the user regarding the information acquired during capture of the multiple viewing locations and corresponding linking information, such as if it determines that one or more segments of the recorded information are of insufficient or undesirable quality to serve as the basis for generating a panorama image, or do not appear to provide complete coverage of the building, or would provide information for additional inter-panorama links.

After block 560, the routine proceeds to block 590 to store the acquired data and/or to transmit the acquired data from the mobile device to a remote BICA system (such as for analysis and/or storage by the remote BICA system for future use). The routine then proceeds to block 599 and ends. In situations in which the routine 500 is invoked from block 415 of FIG. 4, the routine will then return to block 417 of FIG. 4, including to provide the acquired building interior data to that routine 400.

FIGS. 6A-6B illustrate an example flow diagram for an embodiment of a Panorama Connection routine 600. The routine may be performed by, for example, execution of the Panorama Connection manager 264 of FIG. 1B, the Panorama Connection manager component 346 of FIG. 3, the BICA application 155 of FIG. 1A, and/or the BICA system discussed with respect to FIGS. 2A-2E, such as to determine inter-panorama connection information based on using captured linking information and/or image/feature matching. In addition, the routine may be initiated in various manners in various embodiments, such as from block 430 of FIG. 4.

In the illustrated embodiment, the routine begins at block 605, where a next pair of panorama images is selected to be analyzed for inter-connection information, beginning with a first pair that includes the first and second panorama images corresponding to the first and second viewing locations in a sequence of multiple viewing locations within a house, building or other structure. The routine then continues to block 610 to determine whether to attempt to determine connection information between the pair of panorama images via image/feature matching, such as based on overlap of features in images/frames from the two panorama images, and if so, continues to block 615. It will be appreciated that in some embodiments, connection determination via image/feature matching may not be performed, such as if all connection information between pairs of panorama images is determined using captured linking information, as discussed in greater detail with respect to blocks 655-670.

In the illustrated embodiment, the routine in block 615 begins by optionally filtering pairs of frames/images from the panorama images (e.g., corresponding to individual frames from a video used to construct the panorama images) that do not have sufficient overlapping coverage, although in other embodiments each image/frame in one of the two panoramas may be compared to each image/frame in the other of the two panorama images to determine an amount of overlap, if any, between the pair of images. In the illustrated embodiment, the routine continues to block 620 from block 615, where it matches non-filtered pairs of frames/images from the two panorama images with overlapping coverage using one or both of essential matrix and/or homography matrix decomposition processing techniques, although other processing techniques may be used in other embodiments. In addition, the routine may optionally select in block 620 whether to retain and use results for each pair from only one of essential matrix processing and homography matrix decomposition processing if both are performed, such as depending on whether information in the pair of frames corresponds to a flat planar surface or instead as information in a 3D space. In other embodiments, results from both essential matrix processing and homography matrix decomposition processing may be retained and used, or instead only one of the two (and possibly other) types of processing may be used. The routine further continues in block 620 to determine relative rotation and translation/distance between the viewing locations for the two panorama images from the results of the one or more processing techniques, optionally by combining results from multiple matching image/frame pairs to determine aggregate consensus inter-panorama connection information, and optionally computing a confidence value in the resulting information, as discussed in greater detail elsewhere herein.

After block 620, the routine continues to block 625 to determine whether to attempt to also connect the two panorama images via analysis of captured linking information along a travel path that the user took between the viewing locations corresponding to the two panorama images. If so, or if it is instead determined in block 610 to not attempt to connect the two panorama images via image matching, the routine continues to perform blocks 650-670 to use such linking information to determine relative rotation and location/direction/distance between the panorama images. In particular, the routine determines in block 650 whether the two panorama images are consecutive images in the sequence, such that linking information is available for a travel path that the user travels between the two viewing locations corresponding to the two panorama images, and if not continues to block 630. Otherwise, the routine continues to block 655 to obtain that linking information for that travel path, including acceleration data from the mobile device IMU sensor unit(s), and optionally video information as well if available.

After block 655, the routine continues to block 660 to determine the departure direction of leaving the viewing location corresponding to the start panorama image and the arrival direction of arriving at the viewing location of the end panorama image, using video information if available to match initial video information for the departure to one or more corresponding frames of the start panorama image and to match final video information for the arrival to one or more corresponding opposite-side frames of the end panorama image. If video information is not available, leaving and arrival directions may be determined in other manners, such as based solely on analysis of the captured acceleration data and/or other location information for the mobile device. After block 660, the routine continues to block 665 to analyze the acceleration data in the captured linking information along the travel path—in particular, for each acceleration data point, a double integration operation is performed to determine first velocity and then location corresponding to that acceleration data point, including in the illustrated embodiment to determine corresponding velocity and location for each of x, y, and z axes in three dimensions. In block 670, the routine then combines the determined velocity and location for each of the acceleration data points to form a modeled travel path, along with the determined leaving/arriving directions, and uses the resulting information to determine relative rotation and location/distance between the panorama images, optionally with a corresponding confidence value. Additional details related to the analysis and use of such linking information is discussed in greater detail elsewhere herein.

After block 670, or if it instead determined in block 650 that the two panorama images do not have captured linking information for a travel path between them, the routine continues to block 630 to, if connection information is available from both image matching and linking information, combine the information into a final determined aggregate relative direction and distance/location for the panorama images, along with the resulting confidence value from the combination. After block 630, or if it is instead determined in block 625 to not use linking information to connect the two panorama images, the routine continues to block 635 to, for each panorama in the pair and based on the determined relative position information, determine a direction of the other panorama relative to the current panorama starting point, identify one or more frames in the current panorama that correspond to that determined direction, and store information for the current panorama about an inter-panorama link to the other panorama for those one or more frames.

After block 635, the routine continues to block 645 to determine whether there are more pairs of panorama images to analyze, and if so, returns to block 605 to select the next such pair. In some embodiments, each consecutive pair of panorama images in the sequence of viewing locations is analyzed, and then some or all other pairs of panorama images that do not have corresponding linking information based on a travel path between those viewing locations are considered, so as to determine and provide inter-panorama connection information for all pairs of panorama images for which information is available. As discussed in greater detail elsewhere herein, in some embodiments, some links between pairs of panoramas may not be provided even if they may be calculated, however, such as to provide inter-panorama links upon display to an end user only for a subset of panorama pairs (e.g., corresponding to panorama pairs that are visible to each other, or near each other within a defined distance, or otherwise satisfy one or more specified criteria).

If it is instead determined in block 645 that there are no more pairs of panorama images to consider, the routine continues to block 690 to optionally perform a global review of the respective panorama locations and the relative directions between them for overall consistency, and to update that determined information as appropriate, as discussed in greater detail elsewhere. If so, such an update may include updating the stored information for one or more panoramas about one or more inter-panorama links from that panorama to one or more other panoramas. After block 690, the routine continues to block 695 to provide information about the determined linked panorama images, and continues to block 699 and ends. In situations in which the routine 600 is invoked from block 430 of FIG. 4, the routine will then return to block 435 of FIG. 4, including to provide the information about the determined linked panorama images to that routine 400.

FIG. 7 illustrates an example flow diagram for an embodiment of a Building Interior Representation Presentation routine 700. The routine may be performed by, for example, execution of the Building Interior Representation Presentation manager 268 of FIG. 1B, the Building Interior Representation Presentation manager component 344 of FIG. 3, the BICA application 155 of FIG. 1A, and/or the BICA system discussed with respect to FIGS. 2A-2E, such as to display or otherwise present information about the generated representation of the interior of one or more target buildings. In addition, the routine may be initiated in various manners in various embodiments, such as from block 440 of FIG. 4, or instead in some embodiments by an end user interacting with his or her client device to obtain (e.g., retrieve from a remote location over one or more networks and/or from local storage) information about one or more linked panorama images representing a building interior. While the illustrated embodiment includes the linked panorama images representing or covering a single house, building or other structure, in other embodiments the linked panoramas or other linked visual information may extend beyond a single such structure, as discussed in greater detail elsewhere herein.

The example embodiment of the routine begins at block 705, in which a user request is received for displaying of presentation information regarding a specified building interior that has been previously captured. In response to the user request, the routine proceeds to block 710 to retrieve stored presentation information regarding the specified building interior. Once the presentation information is retrieved, the routine proceeds to block 715, and causes a client computing system associated with the user request to display an initial panorama image corresponding to a determined first viewing location within the specified building interior, as well as to display indications of one or more visual inter-panorama links to corresponding additional viewing locations, such as by transmitting information to the client computing system that includes at least the initial panorama image and its inter-panorama links (and optionally corresponding information for some or all other panorama images for the building). As described elsewhere herein, the initial panorama image may or may not correspond to the viewing location first captured within the specified building interior. In addition, it will be appreciated that an end user may use various local controls to manipulate the initial panorama image in various manners, such as to move horizontally and/or vertically within the panorama image to display different views (e.g., different directions within the building from the viewing location to which the initial panorama image corresponds), to zoom in or out, to apply various filters and/or otherwise adjust the quality or type of information displayed (e.g., if the initial panorama image is constructed from one or more rotations at the viewing location that use different settings or otherwise acquire different types of data, such as one rotation that captures visible light, another rotation that captures infrared light/energy, another rotation that captures ultraviolet light/energy, etc.).

At block 720, after the end user is done with the initial panorama image, the routine determines whether the end user has selected one of the provided links associated with the displayed panorama image, or has instead indicated that the end user is done (e.g., closed the current panorama image and/or its local viewing application on the client system). If the end user is done, the routine continues to block 799 and ends. Otherwise, responsive to the end user selection of one of the displayed links, at block 725 the routine causes the associated client computing system to display a distinct additional panorama image (or other information) corresponding to the selected link in a manner similar to that described with respect to block 715, as well as to display indications of one or more additional links to corresponding additional viewing locations as appropriate for the additional panorama image—as part of doing so, the server system providing the building representation information may optionally transmit additional corresponding information to the client computing system at that time in a dynamic manner for display, or the client computing system may instead optionally retrieve information that was previously sent with respect to block 715 and use that. After block 725, the routine returns to block 720 to await an indication of another user selection of one of the user-selectable links provided as part of the presentation, or to otherwise indicate that the end user is done. In situations in which the routine 700 is invoked from block 440 of FIG. 4, the routine will then return to block 495 of FIG. 4 when it reaches block 799.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
   obtaining, by at least one device, linking information from movement between a sequence of viewing locations within an interior of a building, wherein the linking information includes video information generated by a mobile device as a user carries the mobile device between each successive pair of viewing locations in the sequence;
   determining, by the at least one device, and for each successive pair of viewing locations in the sequence, relative positional information that includes at least a direction from a starting viewing location of the successive pair to an ending viewing location of the successive pair, including analyzing the linking information to model a travel path of the user from the starting viewing location of the successive pair to the ending viewing location of the successive pair, and using the modeled travel path as part of determining the direction;
   generating, by the at least one device, and using the determined direction for each successive pair of viewing locations in the sequence, information to link panorama images for the viewing locations, wherein each of the panorama images is associated with one of the viewing locations and has views from the one viewing location in each of multiple directions, and wherein the generating includes, for each of the viewing locations other than a last viewing location in the sequence, generating an inter-panorama link for the panorama image associated with the viewing location that points toward a next viewing location in the sequence; and
   providing, by the at least one device and for display on a client device, information about the interior of the building that includes the panorama images and that includes the generated inter-panorama links for the panorama images, to enable changing between displays of two of the panorama images upon selection of one of the generated inter-panorama links that is associated with the two panorama images.

2. The computer-implemented method of claim 1 wherein the determining of the relative positional information for one of the successive pairs of viewing locations further includes determining a departure direction from the starting viewing location of the one successive pair by analyzing a first portion of obtained video information that corresponds to that starting viewing location, and determining an arrival direction at the ending viewing location of the one successive pair by analyzing a second portion of obtained video information that corresponds to that ending viewing location, and wherein modeling of the travel path for the one successive pair is further based in part on the determined departure direction and on the determined arrival direction.

3. The computer-implemented method of claim 2 wherein the determining of the relative positional information for the one successive pair further includes determining a second direction from the ending viewing location of the one successive pair to the starting viewing location of the one successive pair, and wherein the generating of the information further includes using the determined second direction to generate an inter-panorama link that points toward the panorama image associated with the starting viewing location of the one successive pair from the panorama image for the ending viewing location of the one successive pair.

4. The computer-implemented method of claim 1 wherein the determining of the relative positional information for one of the successive pairs of viewing locations further includes identifying first image subsets of the panorama image for the starting viewing location of the one successive pair that have features matching second image subsets of the panorama image for the ending viewing location of the one successive pair, and using information from the first image subsets and the second image subsets as part of determining the direction from the starting viewing location of the one successive pair to the ending viewing location of the one successive pair.

5. The computer-implemented method of claim 4 wherein the using of the information from the first image subsets and the second image subsets as part of determining the direction for the one successive pair further includes generating an essential matrix for each of multiple pairs of image subsets each having one of the first image subsets and one of the second image subsets, determining values from the essential matrices for the multiple pairs that correspond to the direction for the one successive pair, and generating an aggregate value for the direction for the one successive pair from the values determined for the multiple pairs.

6. The computer-implemented method of claim 4 wherein the using of the information from the first image subsets and the second image subsets as part of determining the direction for the one successive pair further includes generating a homography matrix for each of multiple pairs of image subsets each having one of the first image subsets and one of the second image subsets, determining values from the homography matrices for the multiple pairs that correspond to the direction for the one successive pair, and generating an aggregate value for the direction for the one successive pair from the values determined for the multiple pairs.

7. The computer-implemented method of claim 4 wherein the using of the information from the first image subsets and the second image subsets as part of determining the direction for the one successive pair further includes determining, for each of multiple pairs of image subsets each having a first image subset and a second image subset, whether to use an essential matrix or a homography matrix to determine a value for the direction for the one successive pair.

8. The computer-implemented method of claim 4 wherein the using of the information from the first image subsets and the second image subsets as part of determining the direction for the one successive pair further includes determining, for each of multiple pairs of image subsets each having one of the first image subsets and one of the second image subsets, and by using reprojection, that a degree of match between the image subsets of the pair exceeds a defined threshold before further using the pair to determine a value for the direction for the one successive pair.

9. The computer-implemented method of claim 4 wherein the using of the information from the first image subsets and the second image subsets as part of determining the direction for the one successive pair further includes generating a confidence value based on the information from the first image subsets and the second image subsets, and using the determined direction from the starting viewing location of the one successive pair to the ending viewing location of the one successive pair based at least in part on the generated confidence value exceeding a defined threshold.

10. The computer-implemented method of claim 9 wherein the generating of the confidence value is based at least in part on a number of peaks in an aggregate consensus distribution generated using multiple pairs of image subsets each having one of the first image subsets and one of the second image subsets, and on circular coverage of samples in at least one of the panorama image for the starting viewing location of the one successive pair or the panorama image for the ending viewing location of the one successive pair.

11. The computer-implemented method of claim 1 wherein the generating of the information to link the panorama images for the viewing locations further includes modifying one or more of the directions from the starting viewing locations of each successive pair to the ending viewing locations of each successive pair by performing a global optimization on the directions, and wherein the generating of the one inter-panorama link is based on at least one of the modified directions.

12. The computer-implemented method of claim 1 wherein the at least one device includes the mobile device and the mobile device performs at least in part the determining and the generating and the providing and/or the at least one device includes one or more server computing devices that are located remotely from the building and are in communication over one or more intervening computer networks with the mobile device and that perform at least in part one or more of the determining and the generating and the providing, and wherein the method further comprises:
 recording, by the mobile device, videos of the interior from each of the viewing locations as the user turns at the viewing locations; and
 creating, by the at least one device and from the recorded videos, the panorama images for the viewing locations.

13. The computer-implemented method of claim 1 wherein the providing of the information includes receiving an indication from the client device of a user selection of the one generated inter-panorama link during a display of one of the two panorama images, and causing, based at least in part on the user selection of the one generated inter-panorama link, the client device to display the other of the two panorama images.

14. A non-transitory computer-readable medium having stored contents that cause one or more computing devices to perform automated operations, the automated operations including at least:
 obtaining linking information for a sequence of viewing locations associated with a structure that include at least one viewing location within an interior of the structure, wherein the linking information includes data that is generated as an acquisition device moves along a travel path between the viewing locations and that includes one or more images captured between each pair of successive viewing locations in the sequence;
 determining, by the one or more computing devices, and for one or more of the pairs of successive viewing locations in the sequence, relative positional information that includes at least a direction from a starting viewing location of the pair to an ending viewing location of the pair, including analyzing the linking information to model a portion of the travel path from the starting viewing location to the ending viewing location and using the modeled portion of the travel path as part of determining the direction;
 generating, by the one or more computing devices, and using the determined direction for each of the one or more pairs of successive viewing locations, information to link the starting viewing location for the pair to the ending viewing location for the pair, including generating a link for visual information associated with the starting viewing location for the pair that points toward the ending viewing location for the pair; and
 providing, by the one or more computing devices, information for display about the structure that includes the visual information associated with the starting viewing location of an indicated pair of the one or more pairs, and the generated link for the indicated pair.

15. The non-transitory computer-readable medium of claim 14 wherein the acquisition device is a mobile computing device, wherein the visual information associated with the starting viewing location of the indicated pair is a first panorama image from that starting viewing location, wherein visual information associated with the ending viewing location of the indicated pair is a second panorama image from that ending viewing location, wherein the providing of the information includes providing the visual information associated with the indicated pair and enables an end user to select a displayed representation of the generated link to change between a display of the first panorama image to a display of the second panorama image, and wherein the stored contents include software instructions that, when executed by the one or more devices, program the one or more computing devices to perform the automated operations.

16. A system, comprising:
 one or more hardware processors of one or more computing devices; and
 one or more memories with stored instructions that, when executed by at least one of the one or more hardware processors, cause the one or more computing devices to provide data representing a building, including:

obtaining data for multiple recording locations associated with the building, including data that is recorded at each of the recording locations, and including visual linking information captured during movement between at least some of the recording locations;

determining, for one or more pairs of recording locations, and based at least in part on analyzing the visual linking information, a direction from a starting recording location of the pair to an ending recording location of the pair;

generating, for each of the one or more pairs of recording locations and using the determined direction for the pair, information to link the data recorded at the starting recording location for the pair to the data recorded for the ending recording location for the pair, including generating a link that points between the starting recording location for the pair and the ending recording location for the pair; and providing information for presentation about the building that includes data recorded at one or more of the recording locations and that includes at least one of the generated links.

17. The system of claim 16 wherein data recorded at the one or more recording locations includes a plurality of first images recorded at the starting recording location for one of the one or more pairs and includes a plurality of second images recorded at the ending recording location for the one pair, wherein the visual linking information includes one or more additional images captured during movement between the starting and ending recording locations for the one pair, wherein the stored instructions include software instructions that further cause the one or more computing devices to create a first panorama image for the starting recording location for the one pair from the plurality of first images and to create a second panorama image for the ending recording location for the one pair from the plurality of second images, and wherein the providing of the information further includes:

presenting, on a client device of an end user, the first panorama image for the starting recording location of the one pair, and a visual representation of the generated link between the starting and ending recording locations for the one pair; and presenting, on the client device and after selection of the visual representation of the generated link, additional visual information that includes the second panorama image for the ending recording location of the one pair.

18. The system of claim 16 wherein the one or more recording locations are external to the building, and wherein the obtaining of the data for the multiple recording locations further includes recording data at each of the one or more recording locations corresponding to at least some of an exterior of the building.

19. The system of claim 18 wherein the one or more recording locations further include a sequence of two or more recording locations within an interior of the building, and wherein one or more images are captured at each of the two or more recording locations.

20. The system of claim 16 wherein the obtaining of the data for the multiple recording locations includes, for each of the one or more recording locations, capturing audio data at the recording location.

* * * * *